(12) United States Patent
Mori et al.

(10) Patent No.: US 11,267,503 B2
(45) Date of Patent: Mar. 8, 2022

(54) MOTOR CONTROL DEVICE

(71) Applicant: Mitsubishi Electric Corporation, Tokyo (JP)

(72) Inventors: Tatsuya Mori, Tokyo (JP); Takayuki Kifuku, Tokyo (JP); Akira Furukawa, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 439 days.

(21) Appl. No.: 16/464,378

(22) PCT Filed: Jan. 11, 2017

(86) PCT No.: PCT/JP2017/000642
§ 371 (c)(1),
(2) Date: May 28, 2019

(87) PCT Pub. No.: WO2018/131093
PCT Pub. Date: Jul. 19, 2018

(65) Prior Publication Data
US 2021/0114652 A1 Apr. 22, 2021

(51) Int. Cl.
*B62D 5/04* (2006.01)
*H02P 29/50* (2016.01)
*H02P 27/08* (2006.01)

(52) U.S. Cl.
CPC ......... *B62D 5/0463* (2013.01); *B62D 5/0481* (2013.01); *H02P 27/08* (2013.01); *H02P 29/50* (2016.02)

(58) Field of Classification Search
CPC .... B62D 5/0463; B62D 5/046; B62D 5/0481; H02P 29/50; H02P 27/08
See application file for complete search history.

(56) References Cited

U.S. PATENT DOCUMENTS 7,106,012 B2 * 9/2006 Matsuda ............. B62D 5/0481
318/139
7,164,362 B2 * 1/2007 Hiramine ............. B62D 5/008
324/500

(Continued)

FOREIGN PATENT DOCUMENTS

JP   2001-346393 A   12/2001
JP      4629938 B2    2/2011

OTHER PUBLICATIONS

International Search Report of PCT/JP2017/000642 dated Mar. 21, 2017.

*Primary Examiner* — Tony H Winner
*Assistant Examiner* — Michael R Stabley
(74) *Attorney, Agent, or Firm* — Sughrue Mion, PLLC; Richard C. Turner

(57) ABSTRACT

To provide a motor control device capable of reducing noise without requiring preparation of a plurality of PWM carrier waves, an offset voltage is added equally to each phase of three-phase voltage command values from an inverter to output modified three-phase voltage command values, which are compared to a PWM carrier wave to output three-phase terminal voltages to a motor, and an offset voltage is switched among n offset candidate voltages (n is a natural number of three or more) having different values at set time intervals for output to vary timings to turn on and timings to turn off the three-phase terminal voltages equally for all phases.

18 Claims, 30 Drawing Sheets

(56) References Cited

U.S. PATENT DOCUMENTS

| | | | | |
|---|---|---|---|---|
| 8,981,687 B2* | 3/2015 | Kuroda | ............... | B62D 5/0481 |
| | | | | 318/400.02 |
| 9,731,751 B2* | 8/2017 | Kawamura | .......... | B62D 15/021 |
| 9,780,712 B2* | 10/2017 | Mori | ....................... | H02P 25/22 |
| 10,494,016 B2* | 12/2019 | Takase | ................ | B62D 5/0463 |
| 10,597,071 B2* | 3/2020 | Takase | .................... | H02M 1/38 |
| 2014/0077741 A1* | 3/2014 | Kumagai | ............. | G01R 31/343 |
| | | | | 318/490 |
| 2019/0329817 A1* | 10/2019 | Takase | .................... | H02P 21/05 |
| 2019/0344824 A1* | 11/2019 | Takase | ............. | H02M 7/53871 |

* cited by examiner

MOTOR CONTROL DEVICE

CROSS REFERENCE TO RELATED APPLICATIONS

This application is a National Stage of International Application No. PCT/JP2017/000642 filed Jan. 11, 2017.

TECHNICAL FIELD

The present invention relates to a motor control device, and more particularly, to a motor control device for use in electric power steering.

BACKGROUND ART

In the related art, there is known an example in which, in order to provide an electric motor driving apparatus with reduced electric noise, a plurality of PWM carrier waves of different frequencies are formed, one is selected at random at each specified time from the plurality of formed PWM carrier waves, and an electric motor is driven by PWM control based on the PWM carrier wave selected at random (see Patent Literature 1, for example).

There is also known an example in which a method of reducing EMI through switching frequency dithering includes: providing a controller including at least one register thereof, the controller in signal communication with a motor for controlling the motor based upon operating parameters thereof; selecting a first clock frequency; selecting a first switching frequency; initializing the at least one register to thereby establish a prescribed at least one number; selecting a first hopping period; and randomly modulating a switching frequency of pulse modulation based upon the prescribed at least one number of the at least one register, the first clock frequency, and a first hopping frequency (see Patent Literature 2, for example).

CITATION LIST

Patent Literature

[PTL 1] JP 2001-346393 A
[PTL 2] JP 4629938 B2

SUMMARY OF INVENTION

Technical Problem

In such methods as described in the above-mentioned Patent Literature 1 and Patent Literature 2, in which a plurality of frequencies of PWM carrier waves of an inverter are prepared, and one of the plurality of frequencies is selected, it is required to store the plurality of PWM carrier waves. Therefore, there are problems in that massive memory capacity is required, and that implementation in an inexpensive microcomputer (CPU) becomes difficult. Moreover, when the PWM carrier waves of the inverter are once implemented in the microcomputer or other CPU, a change takes enormous time.

Therefore, in a case where a level of noise measured after a product is finished exceeds a reference value, and a further noise reduction is required, for example, adjustment of the noise level by further adding one or two PWM carrier waves of different frequencies requires enormous time in designing and implementing an additional program in the microcomputer, and may also lead to memory capacity shortage of the microcomputer.

For the above-mentioned reasons, when the measure to reduce noise by adding the PWM carrier waves is difficult, hardware measures such as adding a filter is required, and leads to an increase in cost.

The present invention has been made to solve the above-mentioned problems in the related art, and therefore has an object to provide a motor control device capable of reducing noise without requiring preparation of a plurality of PWM carrier waves.

Solution to Problem

In order to achieve the above-mentioned object, according to one embodiment of the present invention, there is provided a motor control device including: an inverter configured to convert a DC voltage into an AC voltage to output three-phase terminal voltages; a motor to be driven by being applied with the three-phase terminal voltages from the inverter to generate an assist torque for assisting a driver in steering; a three-phase voltage command value calculation unit configured to calculate three-phase voltage command values for controlling the motor to be in a set state; an offset voltage calculation unit configured to calculate an offset voltage; and a modified three-phase voltage command value calculation unit configured to add the offset voltage equally to each phase of the three-phase voltage command values to output modified three-phase voltage command values, wherein the inverter is configured to output the three-phase terminal voltages based on comparison between each of the modified three-phase voltage command values and a PWM carrier wave, and wherein the offset voltage calculation unit is configured to switch the offset voltage among n offset candidate voltages (n is a natural number of three or more) having different values at set time intervals for output to vary timings to turn on and timings to turn off the three-phase terminal voltages equally for all phases.

Advantageous Effects of Invention

According to one embodiment of the present invention, there is adopted a configuration in which the offset voltage is added equally to each phase of the three-phase voltage command values from the inverter to output the modified three-phase voltage command values, which are compared to the PWM carrier wave to output the three-phase terminal voltages to the motor, and the offset voltage is switched among the n offset candidate voltages (n is the natural number of three or more) having different values at the set time intervals for output to vary the timing to turn on and the timing to turnoff the three-phase terminal voltages equally for all phases. Therefore, it is only required of a memory of a microcomputer or other such CPU to store the n offset candidate voltages, with the result that implementation in an inexpensive microcomputer or other such CPU having a small memory capacity becomes possible, and hence can contribute to cost reduction. Moreover, also in terms of noise level adjustment, the adjustment can be performed very easily through only changing the number and magnitudes of offset candidate voltages. Therefore, there is also an effect that time required to design and implement an additional program in the microcomputer can be reduced.

DESCRIPTION OF EMBODIMENTS

Now, a motor control device according to each of various embodiments of the present invention is described in detail with reference to the accompanying drawings.

First Embodiment

Figure 1:
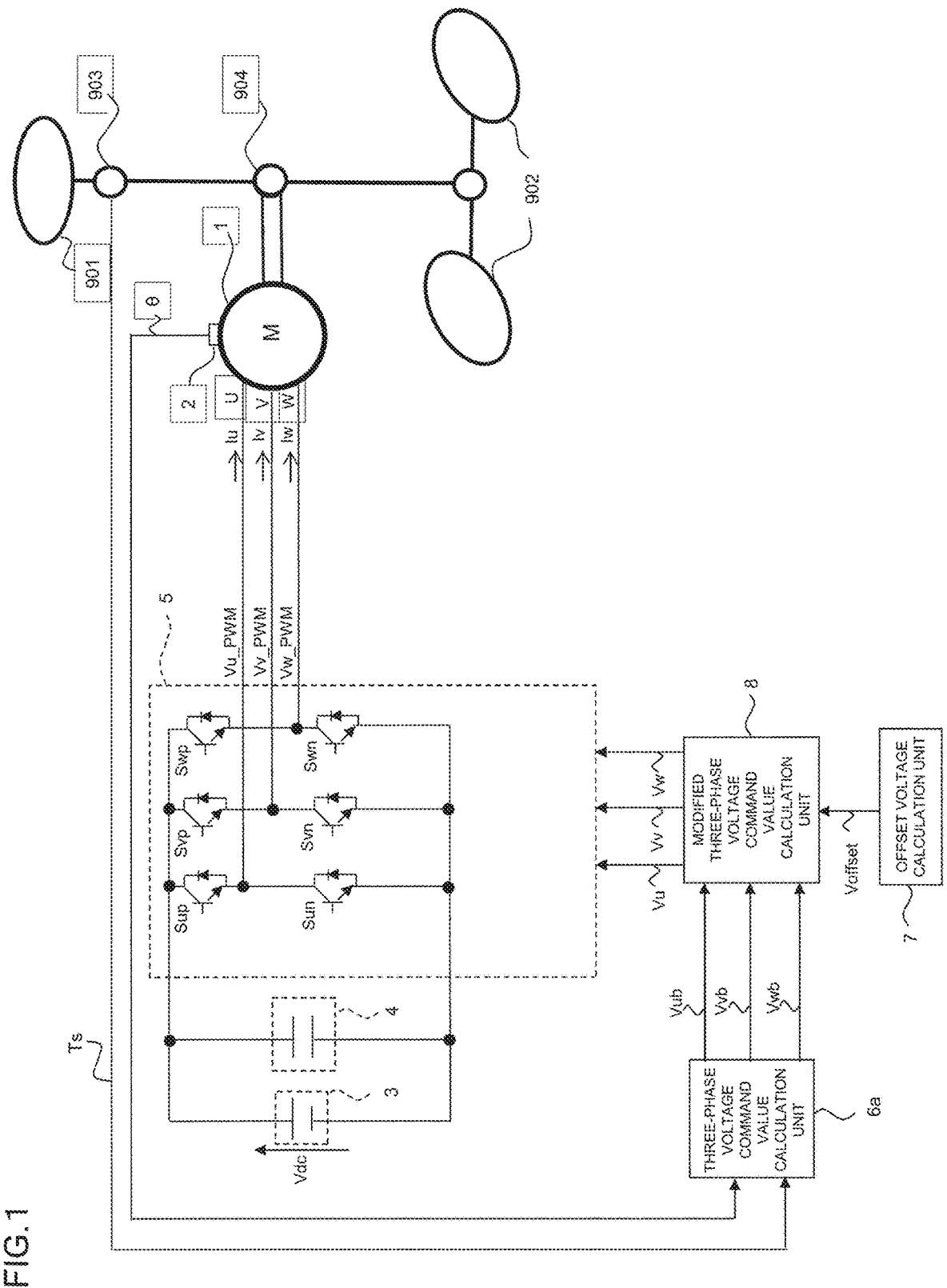
FIG. 1 is an overall configuration diagram for illustrating a motor control device according to a first embodiment of the present invention.

In a motor control device according to a first embodiment of the present invention, which is illustrated in FIG. 1, a driver turns a steering wheel 901 to the right and left to steer front wheels 902. A torque detector 903 is configured to detect a steering torque Ts of a steering system, and output the steering torque Ts to a three-phase voltage command value calculation unit 6a, which is to be described later. A motor 1 is configured to generate an assist torque for assisting the driver in steering via a gear 904.

The motor 1 is a permanent magnet synchronous motor having three-phase windings U, V, and W on a stator and using permanent magnets on a rotor, and electric currents denoted by Iu, Iv, and Iw are allowed to pass through the motor 1 through application of three-phase terminal voltages Vu_PWM, Vv_PWM, and Vw_PWM from an inverter 5, which is to be described later. The motor 1 is configured to generate the assist torque for assisting the driver in steering with the electric current passing therethrough. A rotational position detector 2 is configured to detect a rotor magnetic pole position θ (electrical angle) of the motor 1. A magnetic pole direction of the rotor is hereinafter referred to as a "d-axis", and an axis having a phase difference of 90° in electrical angle from the d-axis is hereinafter referred to as a "q-axis".

A DC power source 3 is configured to output a DC voltage Vdc to the inverter 5 to be described later. Examples of the DC power source include all devices configured to output a DC voltage, such as a battery, a DC-DC converter, a diode rectifier, and a PWM rectifier. In the following first to ninth embodiments of the present invention, a description is given with Vdc being 12 V as an example.

A smoothing capacitor 4 is a capacitor configured to stabilize the DC voltage Vdc of the DC power source 3. The inverter 5 is configured to perform power conversion (DC-AC conversion) from the DC voltage to an AC voltage by controlling six switching elements Sup to Swn to be turned on/off based on comparison between modified three-phase voltage command values Vu, Vv, and Vw, which are to be described later, and a PWM carrier wave, which is a triangle wave having a period Tc to be described later, to output the three-phase terminal voltages, which are denoted by Vu_PWM, Vv_PWM, and Vw_PWM, to the three-phase windings U, V, and W of the motor 1, respectively. As each of the switching elements Sup to Swn, an IGBT, a bipolar transistor, a MOS power transistor, or other such semiconductor switch and a diode connected in inverse parallel to each other are used.

The three-phase voltage command value calculation unit 6a is configured to calculate, based on the steering torque Ts of the driver, which is output from the torque detector 903, and the rotor magnetic pole position θ, which is output from the rotational position detector 2, three-phase voltage command values Vub, Vvb, and Vwb for controlling the motor 1 to be in a desired state for output.

Now, the calculation method is described in detail.

A current command value id_target for the d-axis of the motor 1 is set to "0", and a current command value iq_target for the q-axis is set using the steering torque Ts as in the following equation (1-1).

$$iq\_target = ka \cdot Ts \qquad \text{Equation (1-1)}$$

In the equation, ka is a constant, but may be set to be varied in accordance with the steering torque Ts and a travel speed of an automobile. Moreover, iq_target is determined by the above-mentioned equation (1-1), but may be set based on known compensation control depending on a steering state.

Next, on the basis of the current command value id_target for the d-axis, the current command value iq_target for the q-axis, and an angular velocity ω of the motor 1, which is calculated based on the rotor magnetic pole position θ, a voltage command value Vd for the d-axis and a voltage command value Vq for the q-axis are calculatedly the following equations (1-2) and (1-3), respectively.

$$Vd = R \cdot id\_target - \omega \cdot Lq \cdot iq\_target \qquad \text{Equation (1-2)}$$

$$Vq = R \cdot iq\_target + \omega \cdot (Ld \cdot id\_target + \varphi) \qquad \text{Equation (1-3)}$$

In the equations, R, Ld, Lq, and φ are a winding resistance value of the motor 1, a self-inductance for the d-axis, a self-inductance for the q-axis, and the number of flux linkages, respectively.

Next, with the use of the voltage command value Vd for the d-axis, the voltage command value Vq for the q-axis, and the rotor magnetic pole position θ, the three-phase voltage command values Vub, Vvb, and Vwb are calculated by the following equation (1-4).

$$\begin{pmatrix} V_{ub} \\ V_{vb} \\ V_{wb} \end{pmatrix} = \frac{\sqrt{2}}{\sqrt{3}} \begin{bmatrix} \cos(\theta) & -\sin(\theta) \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_d \\ v_q \end{bmatrix} \qquad \text{Equation (1-4)}$$

For the purpose of improving a voltage utilization rate of the inverter 5, three-phase voltage command values Vub', Vvb', and Vwb', which are obtained by performing modulation processing on the three-phase voltage command values Vub, Vvb, and Vwb with the use of a two-phase modulation method, a modulation method in which third harmonic components of the three-phase voltage command values Vub, Vvb, and Vwb are superimposed, or other known technology, may be output.

An offset voltage calculation unit 7 is configured to output an offset voltage Voffset.

A modified three-phase voltage command value calculation unit 8 is configured to output the modified three-phase voltage command values Vu, Vv, and Vw by calculations expressed by the following equations (1-7) to (1-9) with the use of the three-phase voltage command values Vub, Vvb, and Vwb and the offset voltage Voffset.

$$Vu = Vub + Voffset \qquad \text{Equation (1-7)}$$

$$Vv = Vvb + Voffset \qquad \text{Equation (1-8)}$$

$$Vw = Vwb + Voffset \qquad \text{Equation (1-9)}$$

Figure 2:
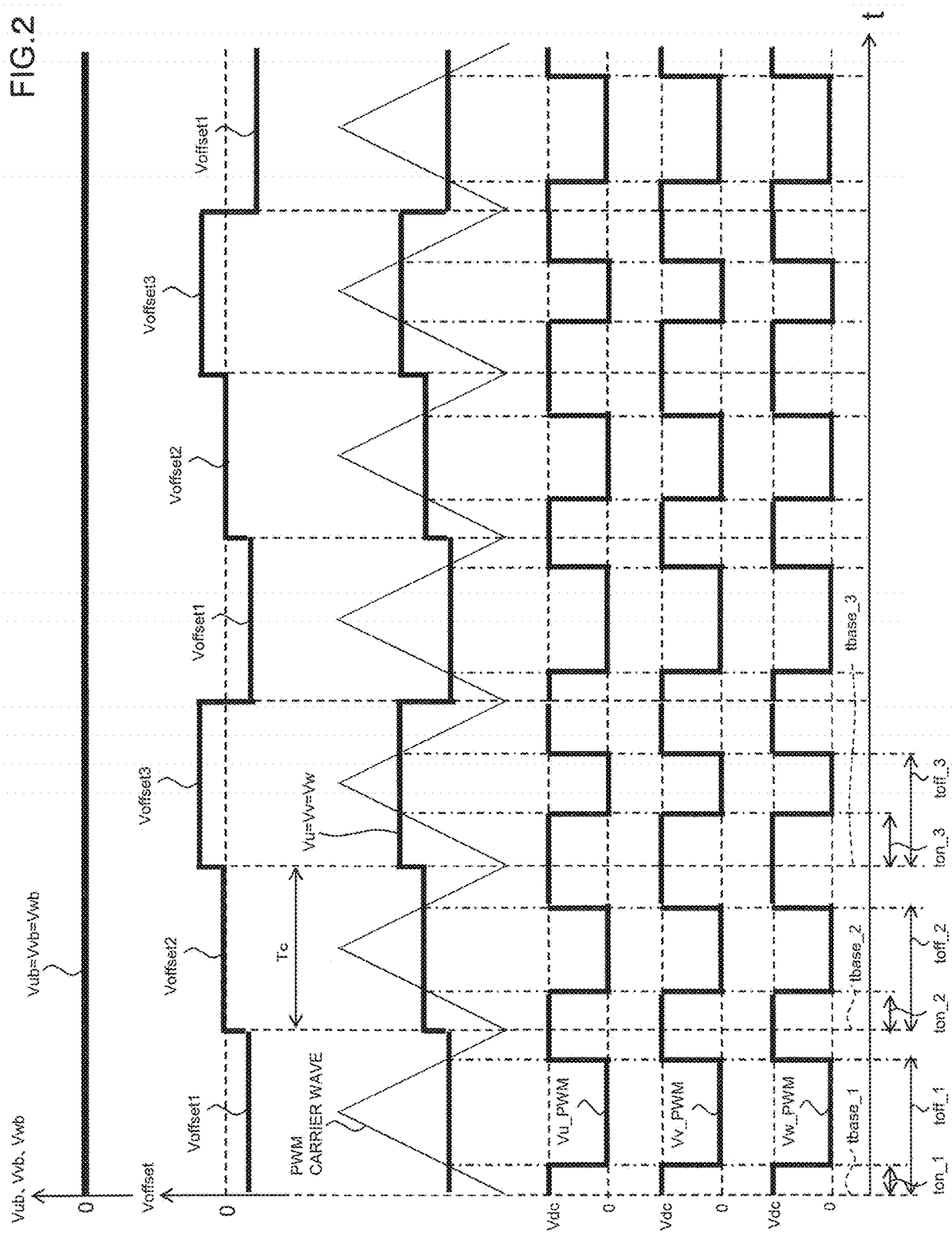
FIG. 2 is time charts of three-phase voltage command values Vub, Vvb, and Vwb, an offset voltage Voffset, a PWM carrier wave, modified three-phase voltage command values Vu, Vv, and Vw, and three-phase terminal voltages Vu_PWM, Vv_PWM, and Vw_PWM in the motor control device of FIG. 1.

Subsequently, operations of the offset voltage calculation unit 7, the modified three-phase voltage command value calculation unit 8, and the inverter 5 are described in detail. FIG. 2 are time charts of the three-phase voltage command values Vub, Vvb, and Vwb, the offset voltage Voffset, the PWM carrier wave, the modified three-phase voltage command values Vu, Vv, and Vw, and the three-phase terminal voltages Vu_PWM, Vv_PWM, and Vw_PWM. For simplification, the three-phase voltage command values are set to the same voltage for all phases (Vub=Vvb=Vwb). It should be understood, however, that also in a case where the voltage command values for the phases are different (Vub≠Vvb≠Vwb), the same description can be made.

Next, the offset voltage calculation unit 7 is configured to set a predetermined time interval such that the offset voltage Voffset is switched among three offset candidate voltages Voffset1, Voffset2, and Voffset3 for each period Tc of the PWM carrier wave. In FIG. 2, the switching period (predetermined time interval) is set to one period Tc of the PWM carrier wave, but the switching may be performed every plural periods of the PWM carrier wave, or every natural number times a half period of the PWM carrier wave. For example, with the period Tc of the PWM carrier wave being 50 μs, the switching period (predetermined time interval) may be set to 100 μs.

It should be noted, however, that the above-mentioned predetermined time interval is set such that n offset candidate voltages are output as the offset voltage within 20 ms.

Next, the modified three-phase voltage command values Vu, Vv, and Vw, which are obtained by adding the offset voltage Voffset equally to the three-phase voltage command values Vub, Vvb, and Vwb, are compared to the PWM carrier wave.

When the modified three-phase voltage command value Vu is larger than the PWM carrier wave as a result of the comparison, the switching element Sup of the inverter 5 is turned on, and the switching element Sun is turned off to output Vdc [V] as the three-phase terminal voltage Vu_PWM, and when the modified three-phase voltage command value Vu is smaller than the PWM carrier wave, the switching element Sup of the inverter 5 is turned off, and the switching element Sun is turned on to output 0 [V] as the three-phase terminal voltage Vu_PWM. Similarly, when the modified three-phase voltage command value Vv is larger than the PWM carrier wave, the switching element Svp of the inverter 5 is turned on, and the switching element Svn is turned off to output Vdc [V] as the three-phase terminal voltage Vv_PWM, and when the modified three-phase voltage command value Vv is smaller than the PWM carrier wave, the switching element Svp of the inverter 5 is turned off, and the switching element Svn is turned on to output 0 [V] as the three-phase terminal voltage Vv_PWM. Similarly, when the modified three-phase voltage command value Vw is larger than the PWM carrier wave, the switching element Swp of the inverter 5 is turned on, and the switching element Swn is turned off to output Vdc [V] as the three-phase terminal voltage Vw_PWM, and when the modified three-phase voltage command value Vw is smaller than the PWM carrier wave, the switching element Swp of the inverter 5 is turned off, and the switching element Swn is turned on to output 0 [V] as the three-phase terminal voltage Vw_PWM. It should be noted, however, that a negative electrode side potential of the DC power source 3 is 0 [V].

From the example of FIG. 2, even though the three-phase voltage command values Vub, Vvb, and Vwb have a constant value, through switching the offset voltage Voffset among the three offset candidate voltages Voffset1, Voffset2, and Voffset3 for each period Tc of the PWM carrier wave for output, a timing to turn off the three-phase terminal voltages Vu_PWM, Vv_PWM, and Vw_PWM, that is, a timing when the three-phase terminal voltages Vu_PWM, Vv_PWM, and Vw_PWM are switched from Vdc [V] to 0 [V] with respect to a reference time (in this case, the minimum value of the PWM carrier wave is defined as the reference time (tbase_1, tbase_2, and tbase_3)) is varied equally for three phases as ton_1, ton_2, and ton_3, and a timing to turn off the three-phase terminal voltages Vu_PWM, Vv_PWM, and Vw_PWM, that is, a timing when the three-phase terminal voltages Vu_PWM, Vv_PWM, and Vw_PWM are switched from 0 [V] to Vdc [V] is varied equally for three phases as toff_1, toff_2, and toff_3.

Next, effects of the first embodiment are described.

The three-phase terminal voltages Vu_PWM, Vv_PWM, and Vw_PWM applied by the inverter 5 have waveforms of rectangular waves (PWM) having the period Tc as shown in FIG. 2, and hence contain large amounts of harmonic components in addition to voltage components originally intended for output. Due to the harmonic components, noise is transmitted or radiated from the inverter 5 to peripheral devices, and causes the peripheral devices to malfunction. Therefore, it is desired to reduce the harmonic components contained in the three-phase terminal voltages as much as possible.

Figure 3:
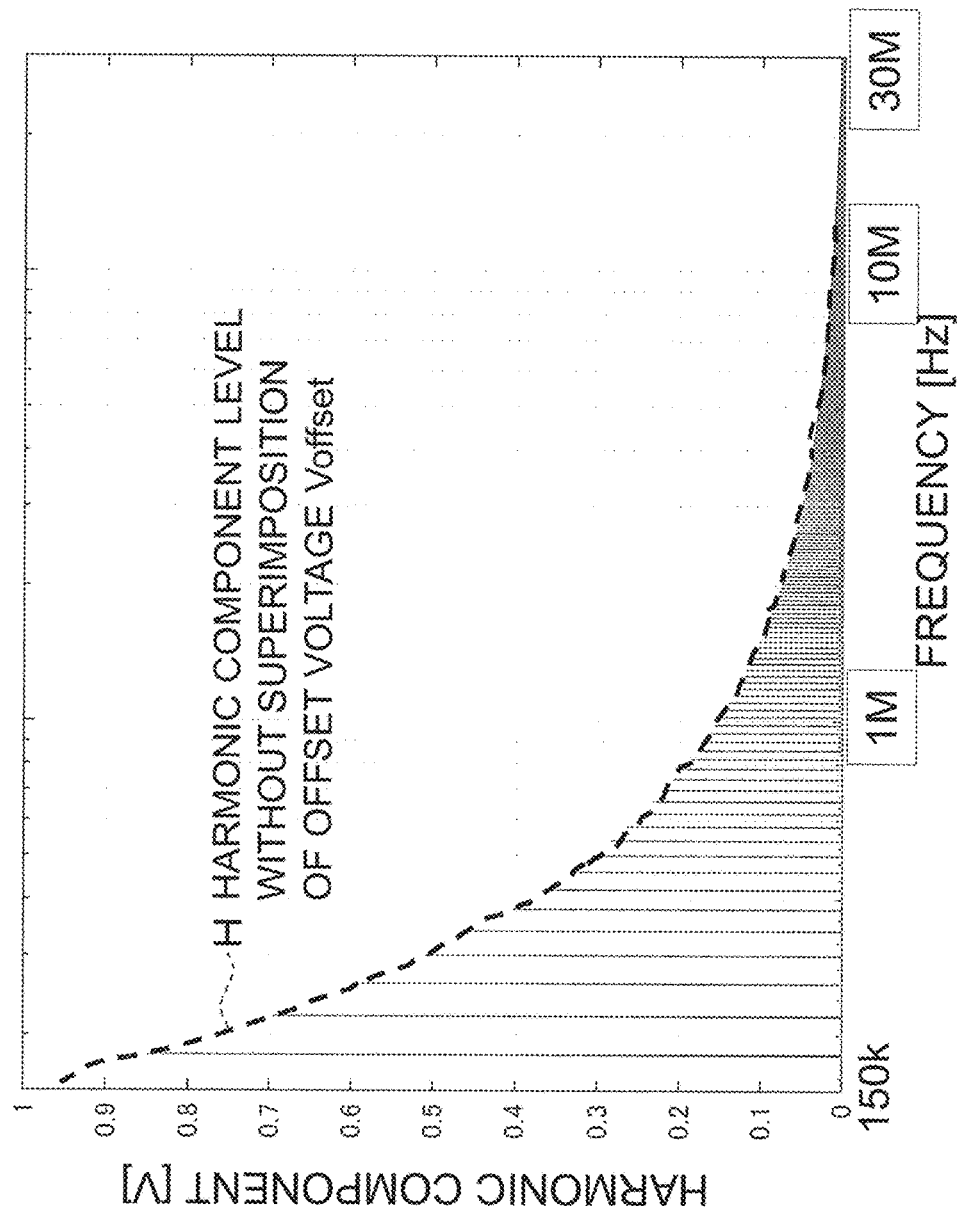
FIG. 3 is a graph for showing a frequency analysis result (analysis frequency range: 150 kHz to 30 MHz) for the three-phase terminal voltage Vu_PWM obtained when the PWM carrier wave is a triangle wave having a period Tc of 50 μs and the offset voltage is always 0 in FIG. 1.

In FIG. 3, there is shown a frequency analysis result (analysis frequency range: 150 kHz to 30 MHz) for the three-phase terminal voltage Vu_PWM obtained when the PWM carrier wave is the triangle wave having the period Tc of 50 μs and the offset voltage Voffset is always "0". This graph is similar for the three-phase terminal voltage Vv_PWM or Vw_PWM, but the following description is given taking the three-phase terminal voltage Vu_PWM as an example.

In FIG. 3, a dotted line H indicates a harmonic component level generated by connecting levels of the components. In order to reduce the noise generated by the inverter 5, it is required to reduce the harmonic component level.

Figure 4:
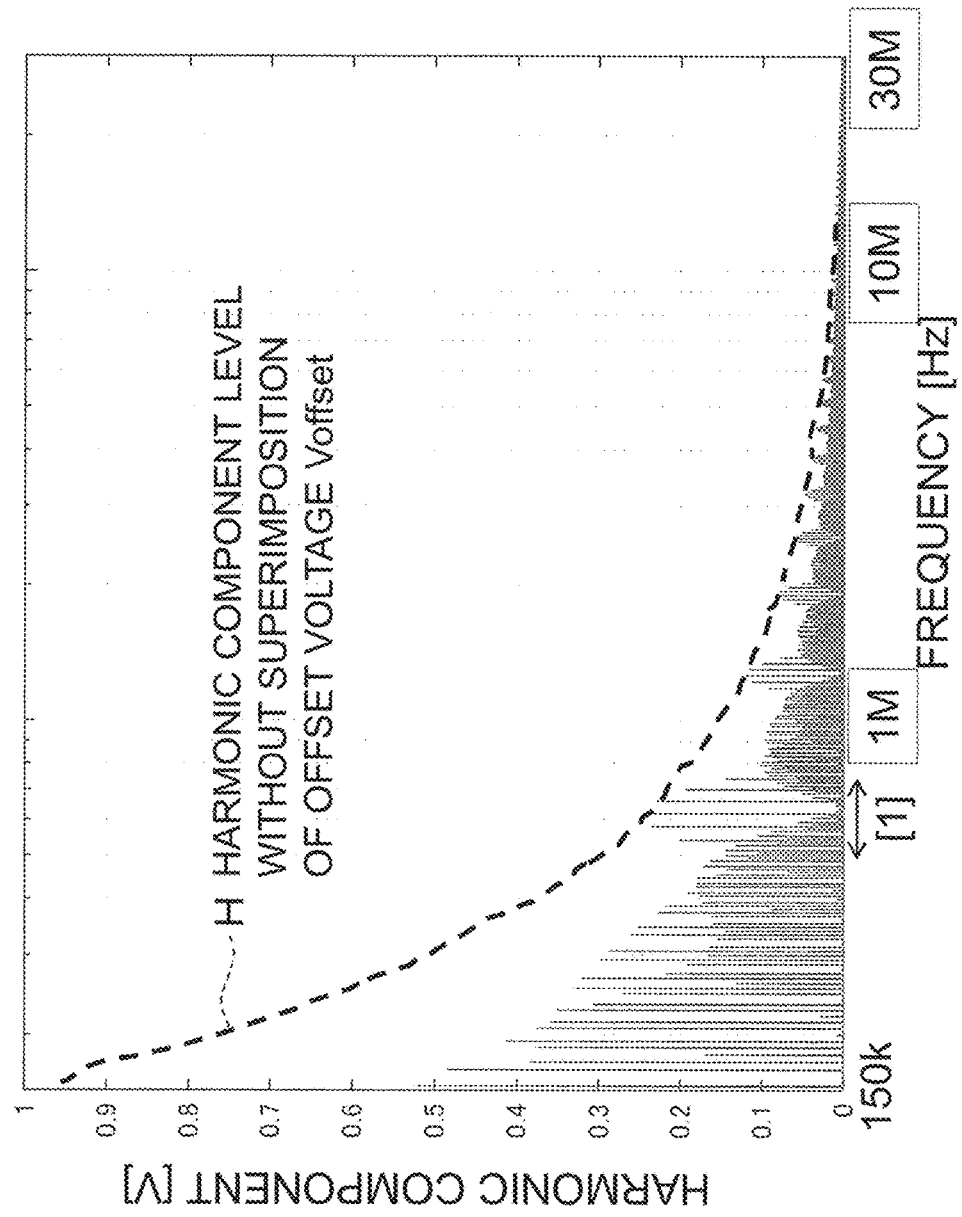
FIG. 4 is a graph for showing a frequency analysis result (harmonic components in analysis frequency range: 150 kHz to 30 MHz. The same applies hereinafter.) for the three-phase terminal voltage Vu_PWM obtained when the offset voltage is switched among three offset candidate voltages in FIG. 1.

In FIG. 4, there is shown a frequency analysis result (analysis frequency range: 150 kHz to 30 MHz) for the three-phase terminal voltage Vu_PWM obtained when the offset voltage Voffset is switched among the three offset candidate voltages Voffset1, Voffset2, and Voffset3 as shown in FIG. 2. It should be noted, however, that Voffset1=0.75 V, Voffset2=0 V, and Voffset3=−0.75 V. In FIG. 4, the harmonic component level without the superimposition of the offset voltage Voffset (in the case where Voffset is always 0), which is shown in FIG. 3, is also indicated by a dotted line H.

It can be seen from FIG. 4 that, through switching the offset voltage Voffset among the three offset candidate voltages for each period of the PWM carrier wave for output, the timing to turn on and the timing to turn off the three-phase terminal voltages are varied equally for all phases, and the harmonic components are reduced in many bands from 150 kHz to 30 MHz, with the result that the noise generated from the inverter 5 can be reduced.

The timing to turn on and the timing to turn off the three-phase terminal voltages can be varied equally also by such methods as described in Patent Literature 1 and Patent Literature 2, in which a plurality of frequencies of the PWM carrier waves of the inverter are prepared, and one of the plurality of frequencies is selected.

However, as described above, it is required to store the plurality of PWM carrier waves, and hence there have been the problems in that massive memory capacity is required, and that implementation in an inexpensive microcomputer (CPU) becomes difficult.

In contrast, in the first embodiment, with a simple configuration in which a plurality of offset candidate voltages are prepared, and the offset voltage is switched and selected from the plurality of offset candidate voltages, the harmonic components contained in the three-phase terminal voltages can be suppressed, and noise can be reduced. Therefore, there can be provided a motor control device that is inexpensive and has a noise suppression effect.

Next, a relationship between the number of offset candidate voltages and the effect of suppressing the harmonic components is described.

Figure 5:
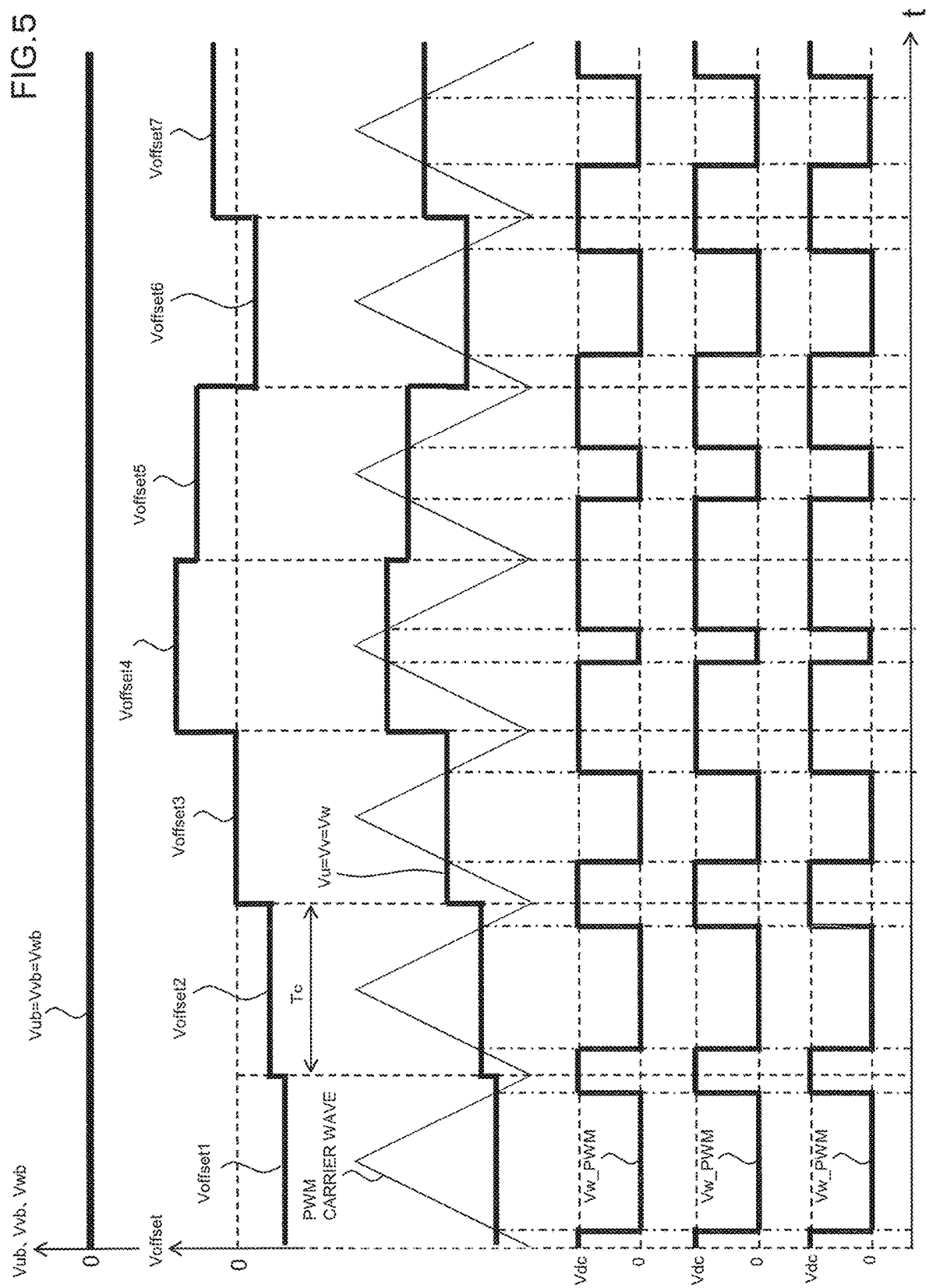
FIG. 5 is time charts obtained when the offset voltage is switched among seven offset candidate voltages for each period of the PWM carrier wave for output in FIG. 1.

The number of offset candidate voltages may be set to a number other than three shown in FIG. 2. In FIG. 5, the offset voltage Voffset is switched among seven offset candidate voltages Voffset1 to Voffset7 for each period Tc of the PWM carrier wave for output.

Figure 6:
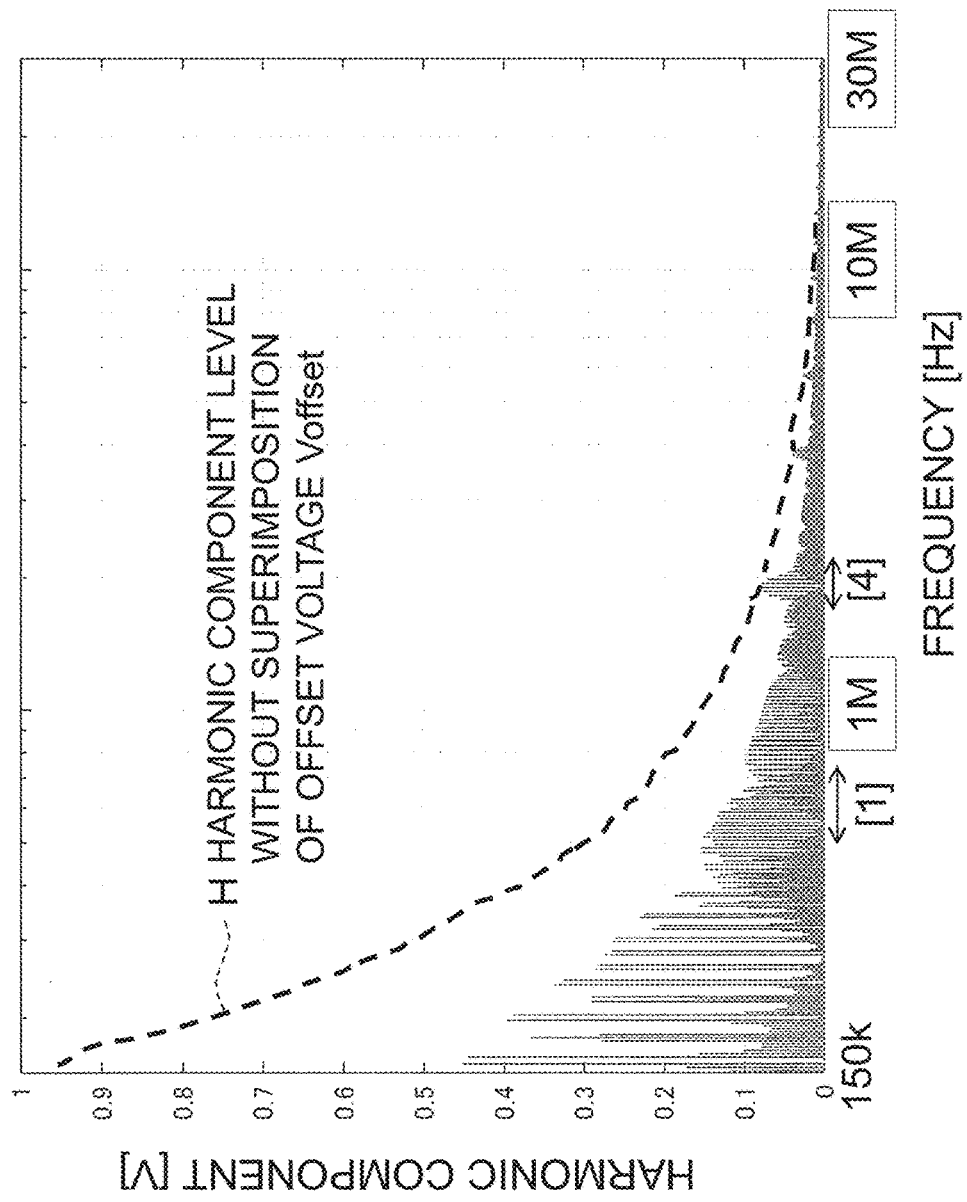
FIG. 6 is a graph for showing a frequency analysis result for the three-phase terminal voltage Vu_PWM in the time charts of FIG. 5.

In FIG. 6, there is shown a frequency analysis result (analysis frequency range: 150 kHz to 30 MHz) for the three-phase terminal voltage Vu_PWM obtained when the offset voltage Voffset is switched among the seven offset candidate voltages Voffset1 to Voffset7. It should be noted, however, that Voffset1=−0.75 V, Voffset2=0.5 V, Voffset3=0 V, Voffset4=0.7 V, Voffset5=0.5 V, Voffset6=−0.25 V, and Voffset7=0.25 V. In FIG. 6, the harmonic component level without the superimposition of the offset voltage Voffset, which is shown in FIG. 3, is also indicated by a dotted line H.

From FIG. 6, through switching the offset voltage Voffset among the seven offset candidate voltages for output, as compared to the case in which the offset voltage Voffset is switched among the three offset candidate voltages, which is shown in FIG. 4, the harmonic components are reduced in more bands from 150 kHz to 30 MHz, with the result that the noise generated from the inverter 5 can be reduced. In particular, the reduction effect is significantly improved in a band [1] in FIG. 4.

It can be seen from the above that, in terms of reducing the harmonic components of the three-phase terminal voltages, seven offset candidate voltages are superior to three offset candidate voltages in noise reduction effect.

Figure 7:
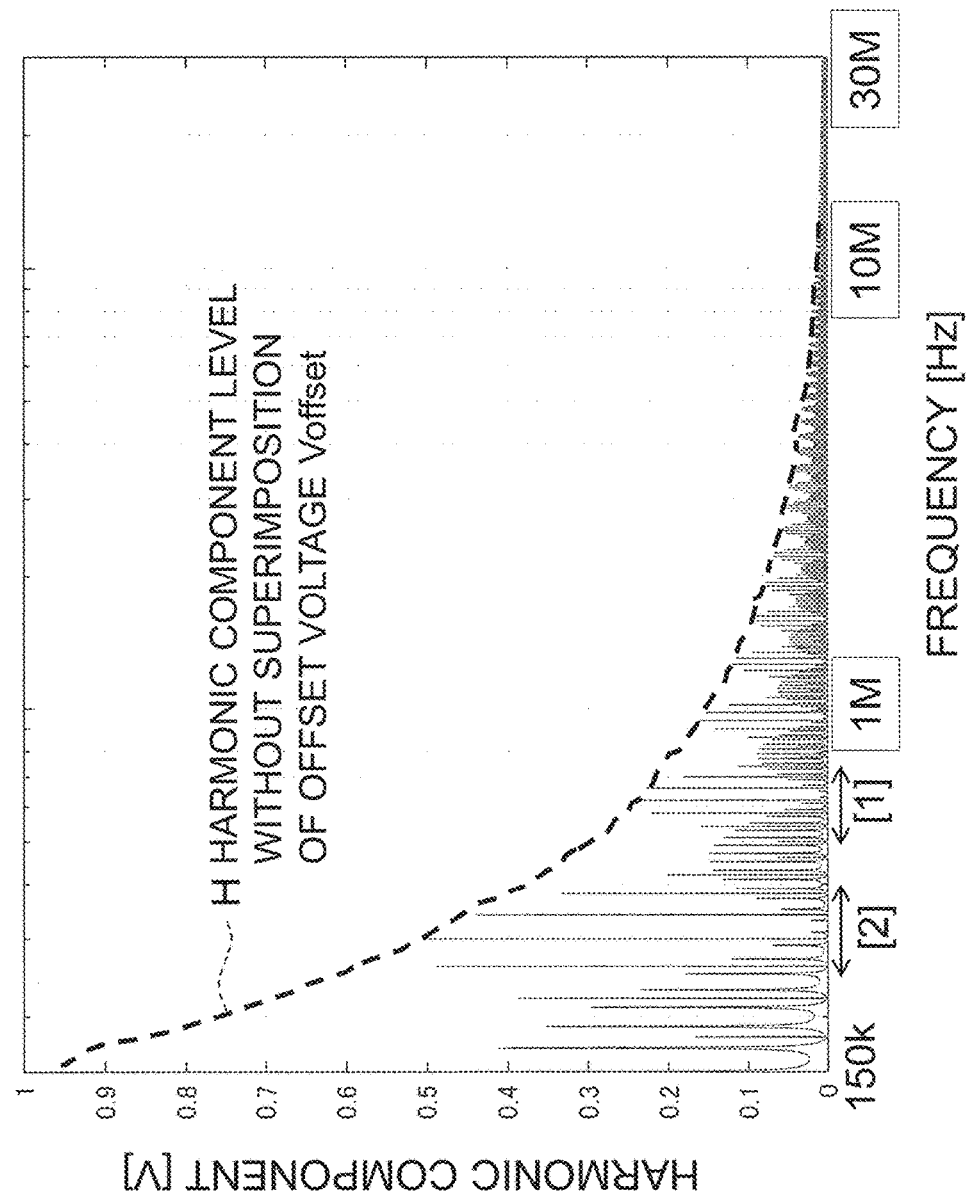
FIG. 7 is a graph for showing a frequency analysis result for the three-phase terminal voltage Vu_PWM obtained when the offset voltage is switched between two offset candidate voltages in FIG. 1.

Subsequently, a frequency analysis result (analysis frequency range: 150 kHz to 30 MHz) for the three-phase terminal voltage Vu_PWM obtained when the offset voltage Voffset is switched between two offset candidate voltages (Voffset1=0.75 V and Voffset2=−0.75 V) is shown in FIG. 7. In FIG. 7, the harmonic component level without the superimposition of the offset voltage Voffset, which is shown in FIG. 3, is also indicated by a dotted line H. From FIG. 7, the harmonic components are not reduced near a band [2]. Therefore, two offset candidate voltages are insufficient, and three or more offset candidate voltages are required.

Figure 8:
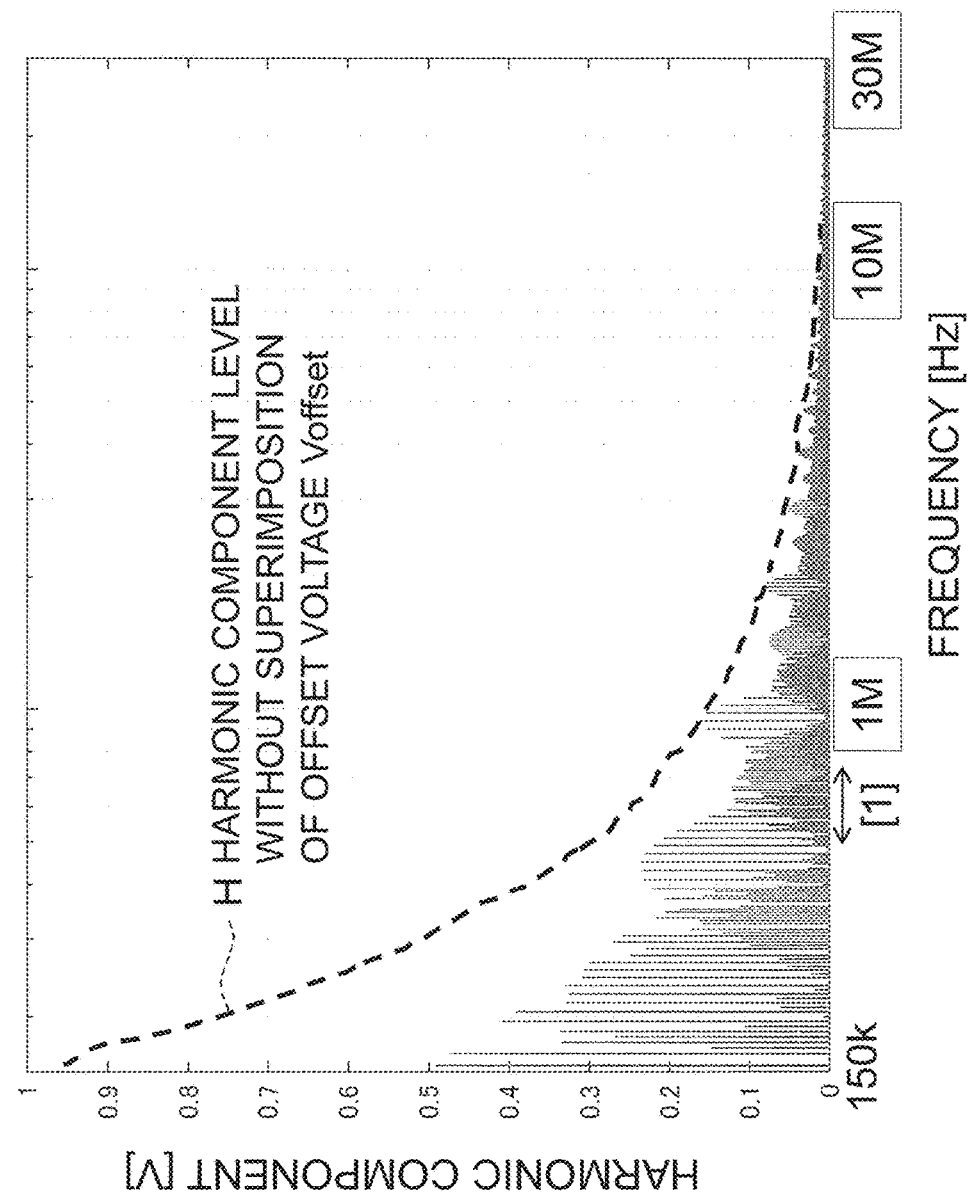
FIG. 8 is a graph for showing a frequency analysis result for the three-phase terminal voltage Vu_PWM obtained when the offset voltage V is switched among four offset candidate voltages in FIG. 1.

Next, a frequency analysis result (analysis frequency range: 150 kHz to 30 MHz) for the three-phase terminal voltage Vu_PWM obtained when the offset voltage Voffset is switched among four offset candidate voltages (Voffset1=0.75 V, Voffset2=0.25 V, Voffset3=−0.25 V, and Voffset4=−0.75 V) is shown in FIG. 8. In FIG. 8, the harmonic component level without the superimposition of the offset voltage Voffset, which is shown in FIG. 3, is also indicated by a dotted line H. From FIG. 8, when the number of offset candidate voltages is four, the harmonic components are reduced as compared to the case in which the number of offset candidate voltages is three, which is shown in FIG. 4, but the effect of suppressing the harmonic components is small as compared to the case in which the number of offset candidate voltages is seven, which is shown in FIG. 6.

Figure 9:
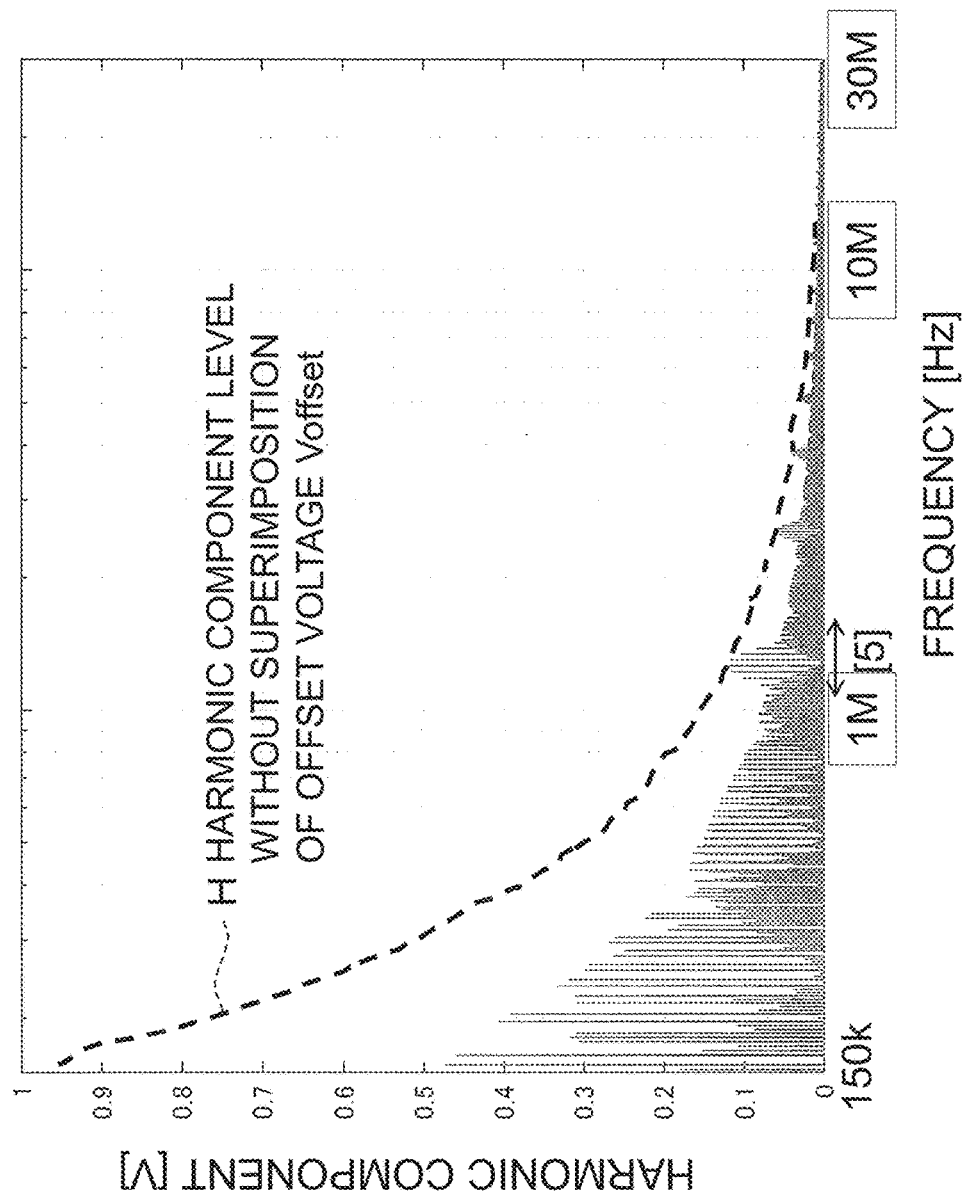
FIG. 9 is a graph for showing a frequency analysis result for the three-phase terminal voltage Vu_PWM obtained when the offset voltage is switched among five offset candidate voltages in FIG. 1.

Next, a frequency analysis result (analysis frequency range: 150 kHz to 30 MHz) for the three-phase terminal voltage Vu_PWM obtained when the offset voltage Voffset is switched with the use of five offset candidate voltages (Voffset1=0.75 V, Voffset2=0.375 V, Voffset3=0 V, Voffset4=−0.375 V, and Voffset5=−0.75 V) is shown in FIG. 9. In FIG. 9, the harmonic component level without the superimposition of the offset voltage Voffset, which is shown in FIG. 3, is also indicated by a dotted line H.

From FIG. 9, when the number of offset candidate voltages is five, the harmonic components in the bands of 1 MHz or less are suppressed as compared to the case in which the number of offset candidate voltages is four, which is shown in FIG. 8, but as compared to the case in which the number of offset candidate voltages is seven, which is shown in FIG. 6, the effect of suppressing the harmonic components is small in the bands of 1 MHz or more, in particular, a band [5].

Figure 10:
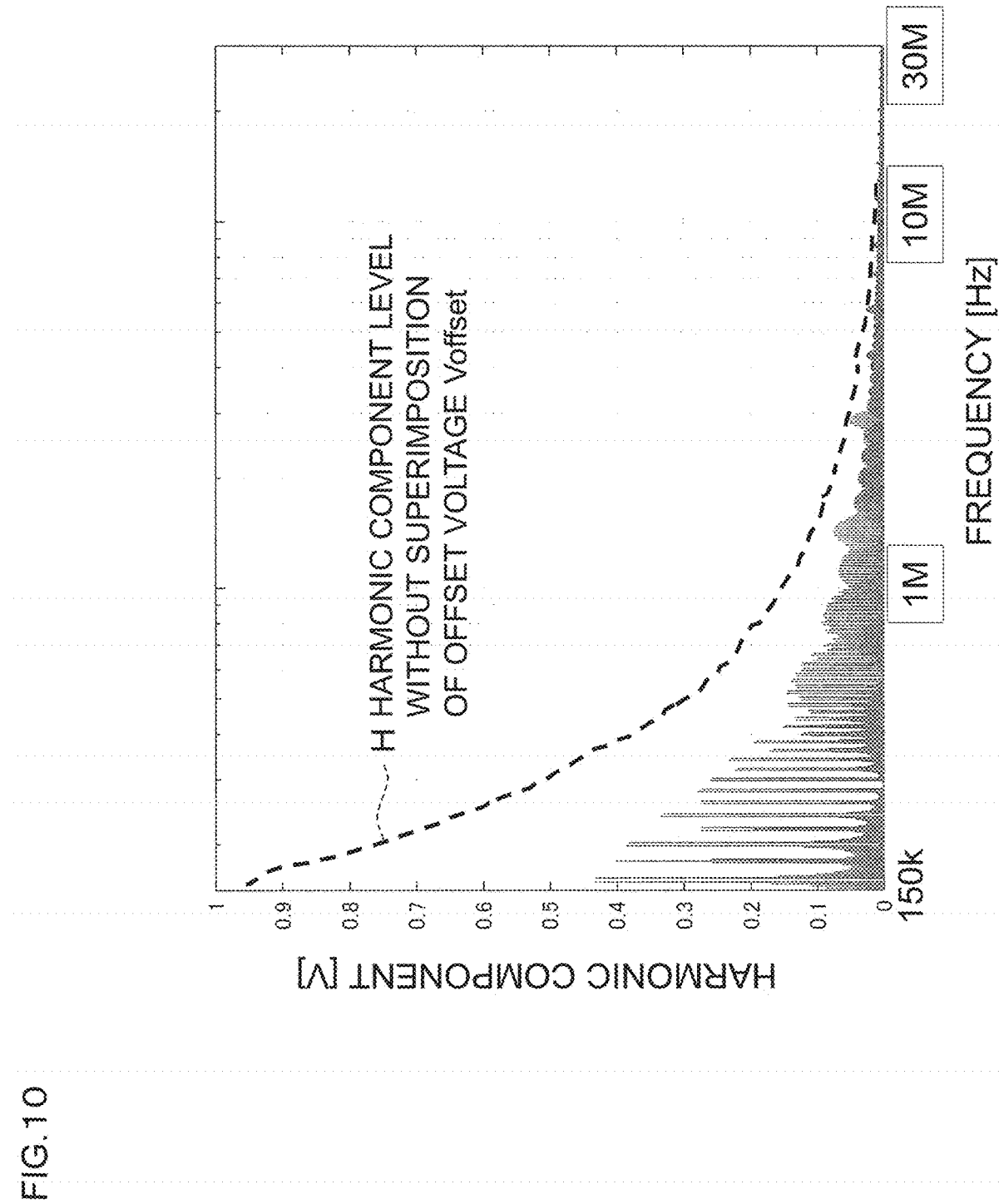
FIG. 10 is a graph for showing a frequency analysis result for the three-phase terminal voltage Vu_PWM obtained when the offset voltage is switched among ten offset candidate voltages in FIG. 1.

Next, a frequency analysis result (analysis frequency range: 150 kHz to 30 MHz) for the three-phase terminal voltage Vu_PWM obtained when the offset voltage Voffset is switched with the use of ten offset candidate voltages (Voffset1=0.75 V, Voffset2=0.584 V, Voffset3=0.417 V, Voffset4=0.251 V, Voffset5=0.084 V, Voffset6=−0.083 V, Voffset7=−0.249 V, Voffset8=−0.416 V, Voffset9=−0.582 V, and Voffset10=−0.75 V) is shown in FIG. 10. In FIG. 10, the harmonic component level without the superimposition of the offset voltage Voffset, which is shown in FIG. 3, is also indicated by a dotted line H.

It can be seen from FIG. 10 that, in the case where the number of offset candidate voltages is ten, the harmonic components in the bands of 1 MHz or more are suppressed as compared to the case in which the number of offset candidate voltages is seven, which is shown in FIG. 6, and hence the effect is high.

Figure 11:
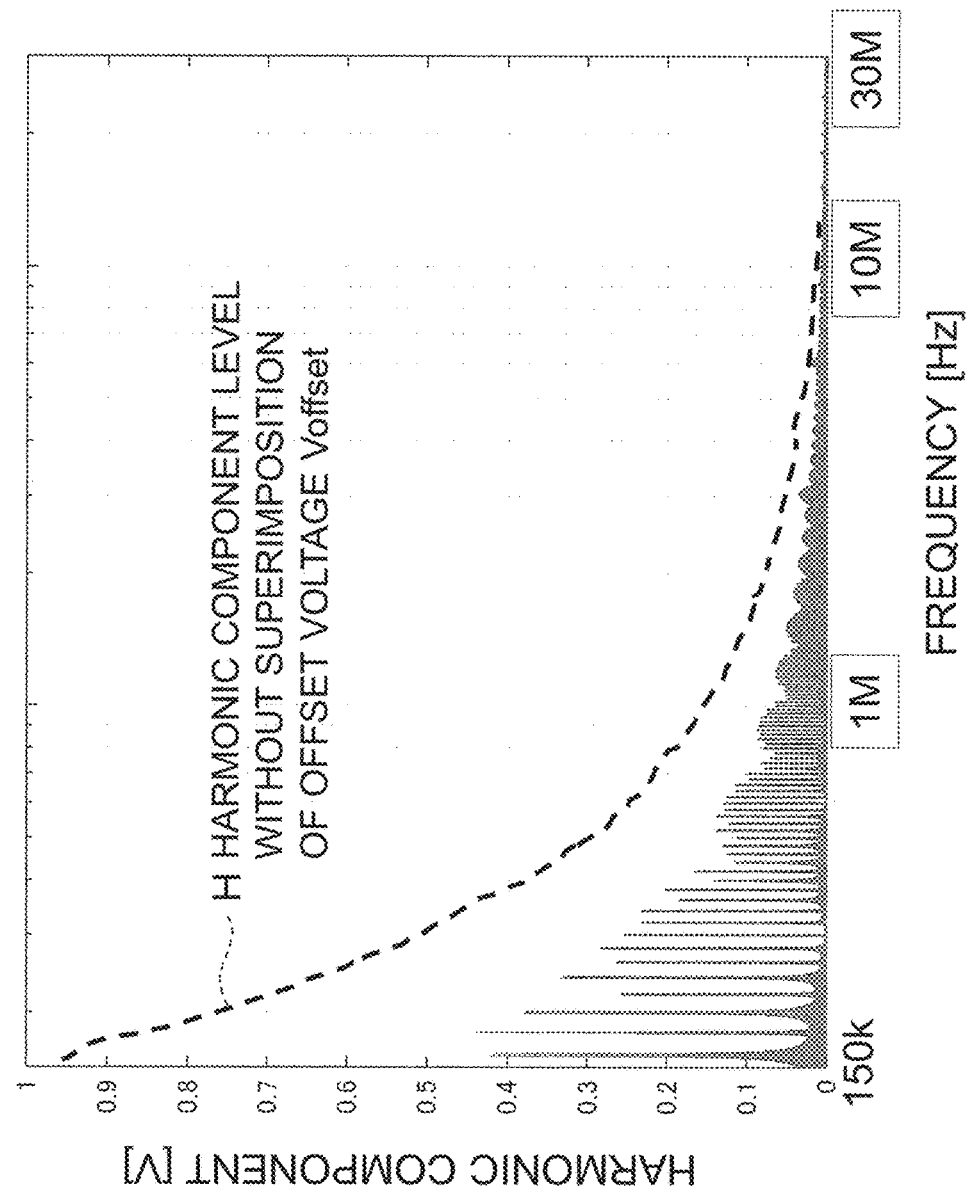
FIG. 11 is a graph for showing a frequency analysis result for the three-phase terminal voltage Vu_PWM obtained when the offset voltage is switched among twenty offset candidate voltages in FIG. 1.

Next, a frequency analysis result (analysis frequency range: 150 kHz to 30 MHz) for the three-phase terminal voltage Vu_PWM obtained when the offset voltage Voffset is switched with the use of twenty offset candidate voltages (Voffset1=0.75 V, Voffset2=0.671 V, Voffset3=0.592 V, Voffset4=0.513 V, Voffset5=0.434 V, Voffset6=0.355 V, Voffset7=0.276 V, Voffset8=0.197 V, Voffset9=0.118 V, Voffset10=0.039 V, Voffset11=−0.039 V, Voffset12=−0.118 V, Voffset13=−0.197 V, Voffset14=−0.276 V, Voffset15=−0.355 V, Voffset16=−0.434 V, Voffset17=0.513 V, Voffset18=−0.592 V, Voffset19=−0.671 V, and Voffset20=−0.75 V) is shown in FIG. 11. In FIG. 11, the harmonic component level without the superimposition of the offset voltage Voffset, which is shown in FIG. 3, is also indicated by a dotted line H.

It can be seen from FIG. 11 that, in the case where the number of offset candidate voltages is twenty, the harmonic components in the bands of 1 MHz or more are suppressed as compared to the case in which the number of offset candidate voltages is ten, which is shown in FIG. 10, and hence the effect is high.

It has been shown from the above description that the number of offset candidate voltages having different values has the effect of suppressing the harmonic components when being three or more, and that the effect of suppressing the harmonic components is higher when being four than when being three, when being five than when being four, when being seven than when being five, when being ten than when being seven, and when being twenty than when being ten. In other words, the number of offset candidate voltages having different values has the higher effect of suppressing the harmonic components as becoming higher.

Therefore, there is a case in which a level of noise measured after a product is finished exceeds a reference value, and a further noise reduction is required, for example. In such a case, with the methods of Patent Literature 1 and Patent Literature 2, it is required to adjust the noise level by further adding one or two PWM carrier waves having different frequencies.

In that case, additional design and implementation in the microcomputer takes enormous time, and may lead to memory capacity shortage of the microcomputer.

In contrast, according to the first embodiment, through adding offset candidate voltages having values different from those of the offset candidate voltages that have hitherto been implemented, and switching the offset voltage among the offset candidate voltages that have hitherto been implemented and the added offset candidate voltages for output, a further noise reduction can be achieved easily. Therefore, there is an effect that the time required for the additional design and implementation in the microcomputer can be reduced.

Next, a proportion k of the above-mentioned offset candidate voltages to the DC voltage Vdc of the DC power source 3 is described.

Figure 12:
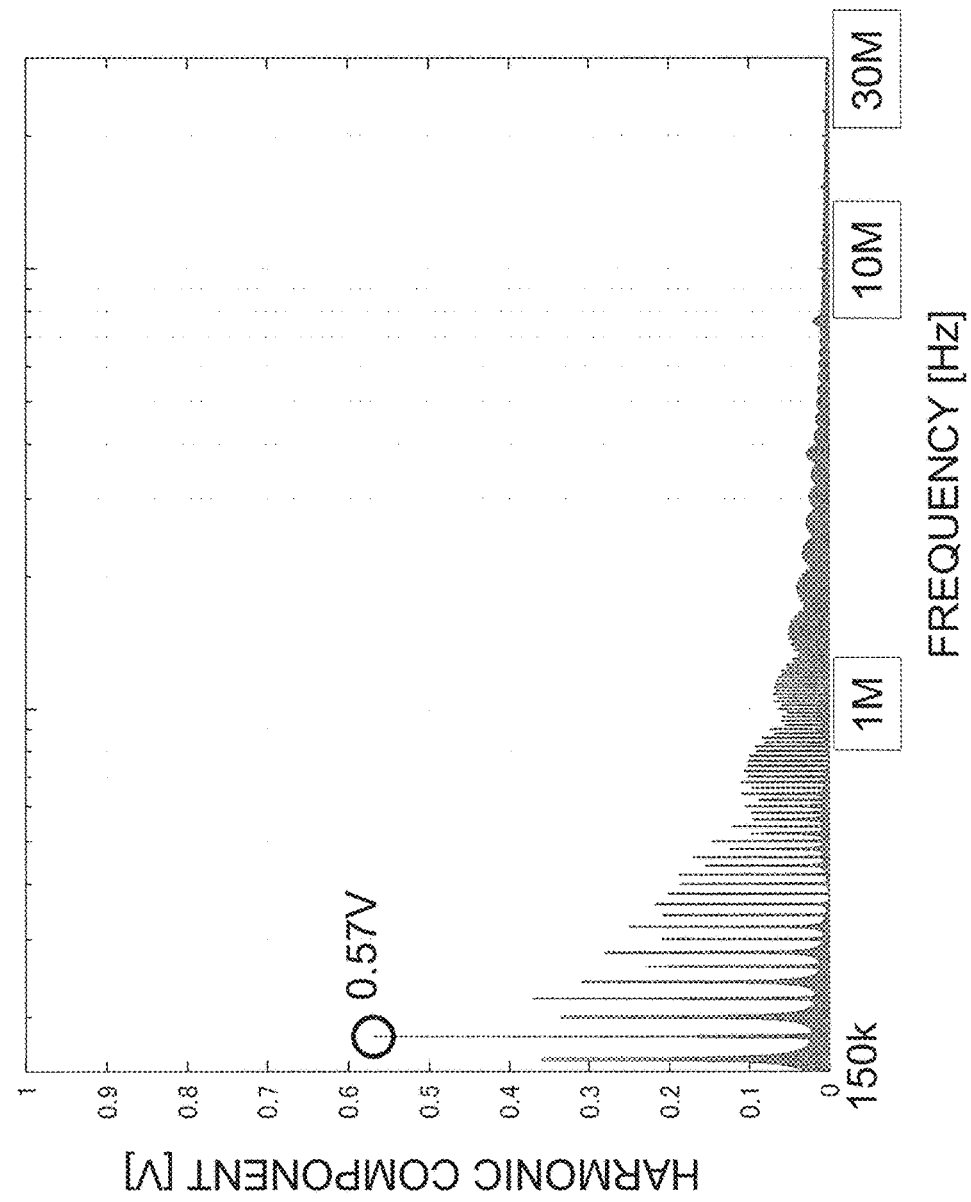
FIG. 12 is a graph for showing a frequency analysis result for the three-phase terminal voltage Vu_PWM obtained when the offset voltage is switched among twenty offset candidate voltages with a proportion k of a difference between an offset candidate maximum voltage and an offset candidate minimum voltage to a power supply voltage Vdc being 0.1 in FIG. 1.

A frequency analysis result (analysis frequency range: 150 kHz to 30 MHz) for the three-phase terminal voltage Vu_PWM obtained when, as the offset voltage Voffset, the number of offset candidate voltages is set to twenty (Voffset1=k×6 [V], Voffset2=0.895×k×6 [V], Voffset3=0.789×k×6 [V], Voffset4=0.684×k×6 [V], Voffset5=0.579×k×6 [V], Voffset6=0.474×k×6 [V], Voffset7=0.368×k×6 [V], Voffset8=0.263×k×6 [V], Voffset9=0.158×k×6 [V], Voffset10=0.052×k×6 [V], Voffset11=−0.052×k×6 [V], Voffset12=−0.158×k×6 [V], Voffset13=−0.263×k×6 [V], Voffset14=0.368×k×6 [V], Voffset15=0.474×k×6 [V], Voffset16=−0.579×k×6 [V], Voffset17=−0.684×k×6 [V], Voffset18=−0.789×k×6 [V], Voffset19=−0.895×k×6 [V], and Voffset20=−k×6 [V]), and switching is performed with k being 0.1 is shown in FIG. 12. In FIG. 12, the largest component in the range of from 150 kHz to 30 MHz is 0.57 V (frequency: 180 kHz).

It can be seen from FIG. 12 that, for k=0.1, the noise component (harmonic component) at the frequency of 180 kHz is large at about 0.57 [V]. In this case, a voltage having the largest value of the twenty offset candidate voltages is Voffset1=k×6 [V], and is defined as an "offset candidate maximum voltage". Similarly, a voltage having the smallest value of the twenty offset candidate voltages is Voffset20=−k×6 [V], and is defined as an "offset candidate minimum voltage". A difference of the offset candidate minimum voltage from the offset candidate maximum voltage is calculated as k×12 [V].

In this case, of the differences k×12 [V], 12 [V] is equal to the DC voltage Vdc, and hence k indicates a proportion of the difference between the offset candidate maximum voltage and the offset candidate minimum voltage to the DC voltage Vdc.

Next, consideration is given on how the largest harmonic component in the bands from 150 kHz to 30 MHz transitions when k is varied.

Figure 13:
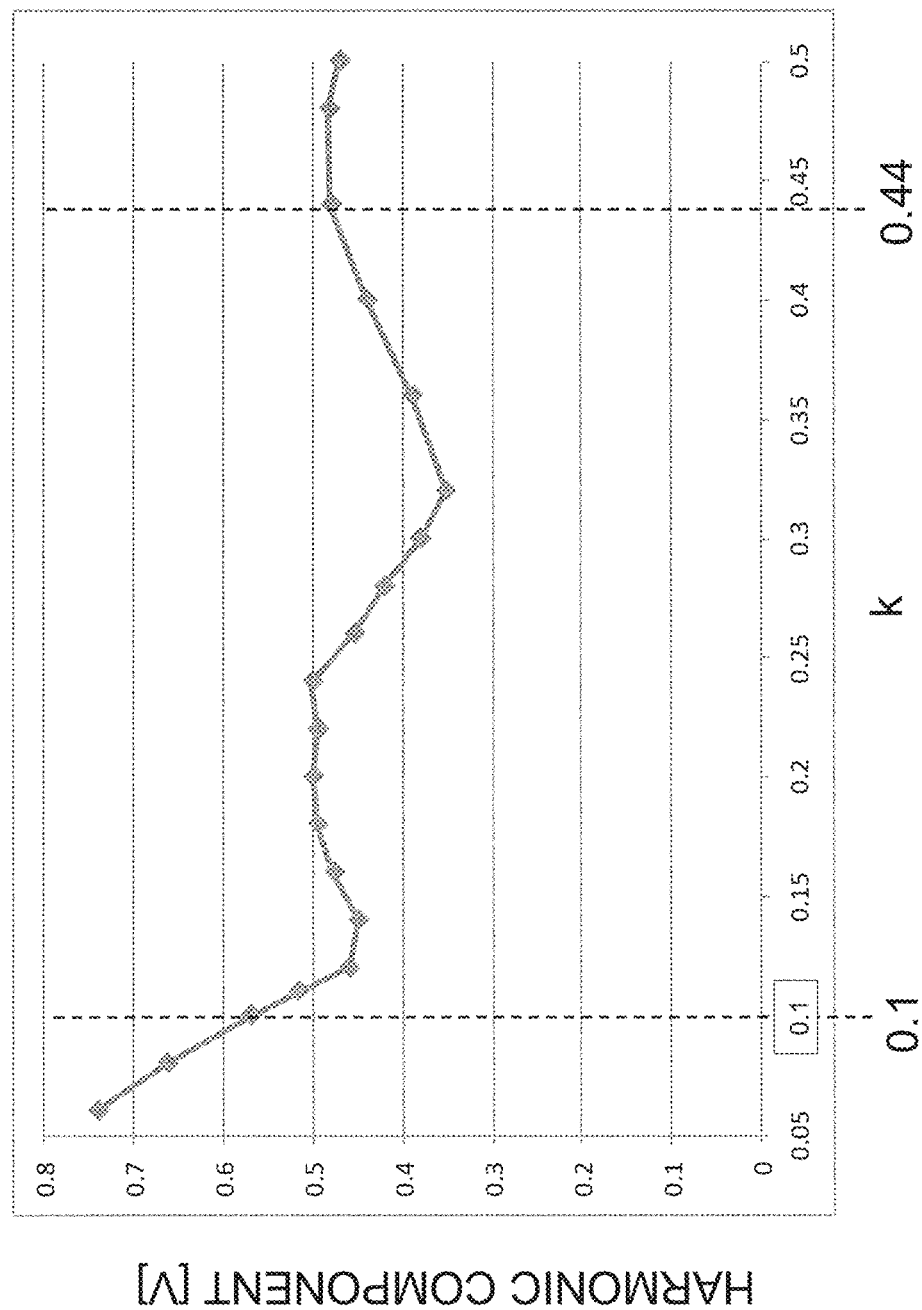
FIG. 13 is a graph for showing how the largest harmonic component in the band of from 150 kHz to 30 MHz transitions when k is varied.

FIG. 13 is a graph for showing the harmonic components with respect to k. From FIG. 13, when k is 10% or more, the harmonic components have values of 0.6 V or less. Therefore, in order to obtain a sufficient effect for reducing the harmonic components, it is only required to set k (ratio of the difference between the offset candidate maximum voltage and the offset candidate minimum voltage to the DC voltage Vdc) to 10% or more.

Moreover, it can be seen from FIG. 13 that, even when k is set to more than 0.44, a significant effect of improving the harmonic components is not anticipated. Therefore, when k is set in a range of from 10% to 44%, a large effect of reducing the harmonic components can be obtained with smaller k. Therefore, even when an amplitude of the three-phase voltage command values Vub, Vvb, and Vwb are large, voltage saturation can be avoided.

The case in which the number of offset candidate voltages is twenty has been described above.

In this case, of the harmonic components in the bands from 150 kHz to 30 MHz, in the bands from 150 kHz to 200 kHz, in which the components are particularly large, the variation in value is small even when the number of offset candidate voltages is changed in the range of natural numbers of three or more. Therefore, when the number of offset candidate voltages is the natural number of three or more, with k being set to 10%, the harmonic components are sufficiently suppressed. Further, with k being set to 44% or less, even when the amplitude of the three-phase voltage command values Vub, Vvb, and Vwb is large, the voltage saturation can be avoided.

Next, a voltage difference between one offset candidate voltage and an offset candidate voltage closest to the one offset candidate voltage is described.

For the twenty offset candidate voltages shown in FIG. 11, a difference in voltage value between any one offset candidate voltage and one offset candidate voltage having a value closest to that of the any one offset candidate voltage has been about 0.079 V as described above.

However, in this example, as opposed to the example described with reference to FIG. 11, a frequency analysis result (analysis frequency range: 150 kHz to 30 MHz) for the three-phase terminal voltage Vu_PWM obtained when twenty offset candidate voltages are set as: Voffset1=0.75 V, Voffset2=0.723 V, Voffset3=0.69 V, Voffset4=0.638 V, Voffset5=0.563 V, Voffset6=0.45 V, Voffset7=0.276 V, Voffset8=0.197 V, Voffset9=0.118 V, Voffset10=0.039 V, Voffset11=−0.039 V, Voffset12=−0.118 V, Voffset13=−0.197 V, Voffset14=−0.276 V, Voffset15=−0.45 V, Voffset16=−0.563 V, Voffset17=−0.638 V, Voffset18=−0.69 V, Voffset19=−0.723 V, and Voffset20=−0.75 V, and the offset voltage Voffset is switched among the offset candidate voltages Voffset1 to Voffset20 for output is shown in FIG. 14.

Figure 14:
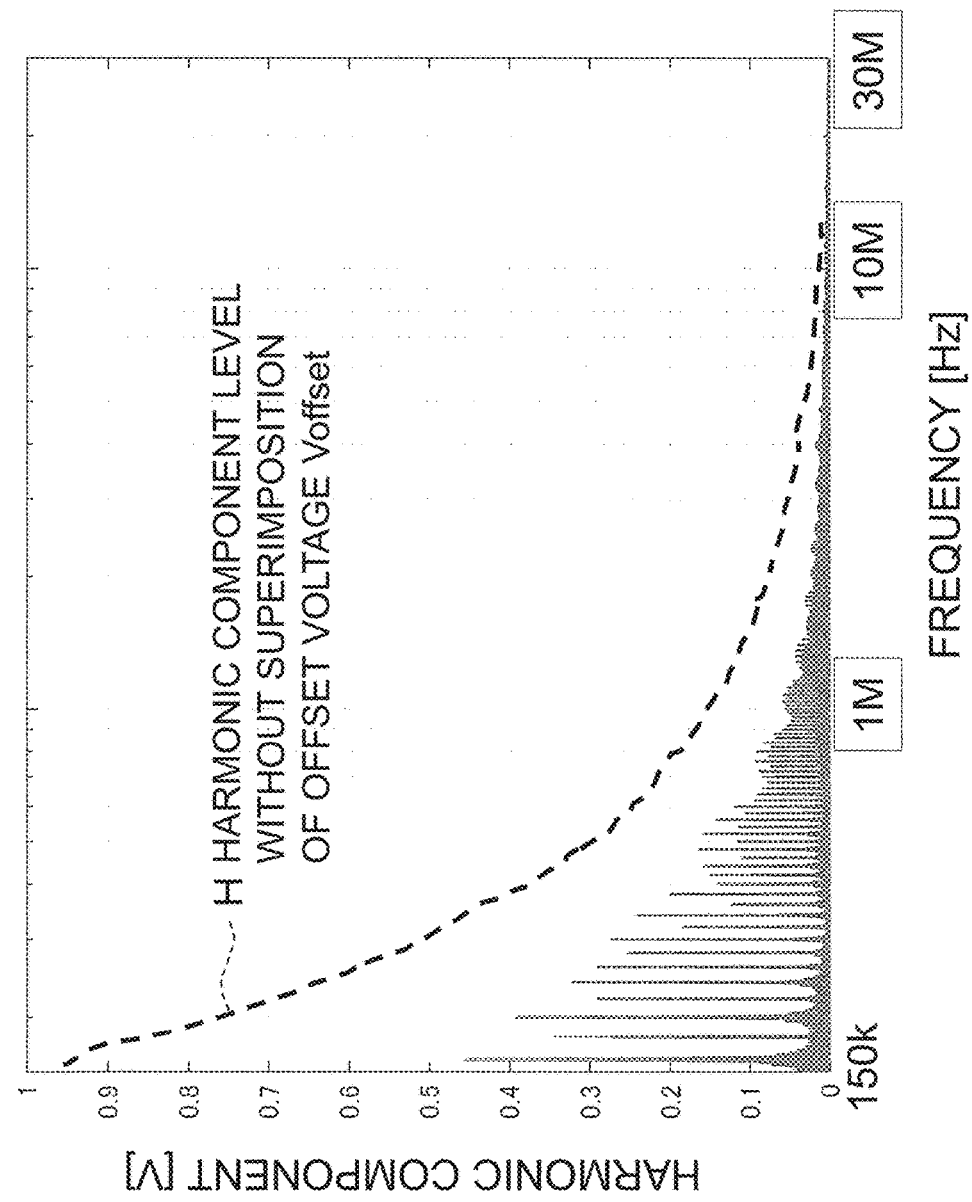
FIG. 14 is a graph for showing a frequency analysis result for the three-phase terminal voltage Vu_PWM obtained when the offset voltage is switched among twenty offset candidate voltages of values different from those in the example of FIG. 11.

When FIG. 14 is compared to FIG. 11, in the bands over about 1 MHz, the example of FIG. 14 is improved (has smaller harmonic components). Therefore, through setting the values of the twenty offset candidate voltages such that, in terms of a difference between the any one offset candidate voltage and the one offset candidate voltage having the value closest to that of the any one offset candidate voltage of the twenty offset candidate voltages, at least one of nineteen voltage differences that exist among the twenty offset candidate voltages is different from the other eighteen voltage differences, the harmonic components can be further reduced.

Moreover, in the example of FIG. 14, when one of the twenty offset candidate voltages takes a value relatively close to the offset candidate maximum voltage (Voffset1) or the offset candidate minimum voltage (Voffset20), a voltage difference between the one offset candidate voltage and a offset candidate voltage having a value closest to that of the one offset candidate voltage is set small. Meanwhile, when another offset candidate voltage takes a value relatively close to an average value (0 V) of the twenty offset candidate voltages, a voltage difference between the another offset candidate voltage and an offset candidate voltage having a value closest to that of the another offset candidate voltage is set large.

Through thus setting the twenty offset candidate voltages such that the voltage differences are different, harmonic voltages can be further suppressed.

Figure 15:
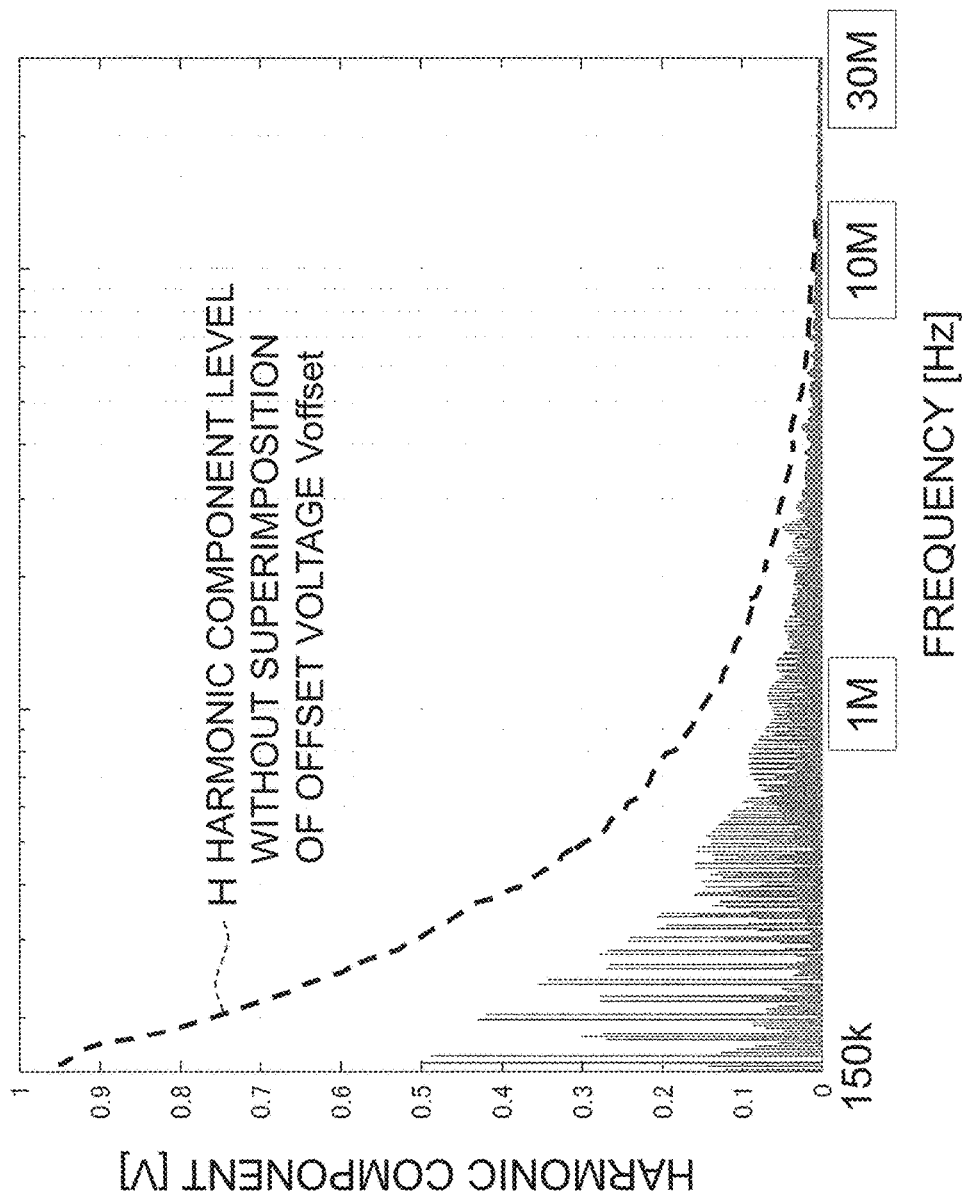
FIG. 15 is a graph for showing a frequency analysis result for the three-phase terminal voltage Vu_PWM obtained when the offset voltage is switched among seven offset candidate voltages of values different from those in the example of FIG. 6.

Next, a frequency analysis result (analysis frequency range: 150 kHz to 30 MHz) for the three-phase terminal voltage Vu_PWM obtained when the offset voltage Voffset is switched with the use of seven offset candidate voltages Voffset1 to Voffset7 (Voffset1=−0.75 V, Voffset2=−0.56 V, Voffset3=−0.3375 V, Voffset4=0V, Voffset5=0.3375V, Voffset6=0.56V, and Voffset7=0.75 V) is shown in FIG. 15.

Also in this example of FIG. 15, through setting the voltage difference small when one offset candidate voltage takes a value relatively close to the offset candidate maximum voltage (Voffset7) or the offset candidate minimum voltage (Voffset1), and setting the voltage difference large when another offset candidate voltage takes a value relatively close to an offset candidate average voltage (0), the harmonic voltages are improved especially in the bands over 1 MHz (in particular, a band [4]) as compared to the case in which the number of offset candidate voltages is seven and the voltage difference is constant, which is shown in FIG. 6.

Figure 16:
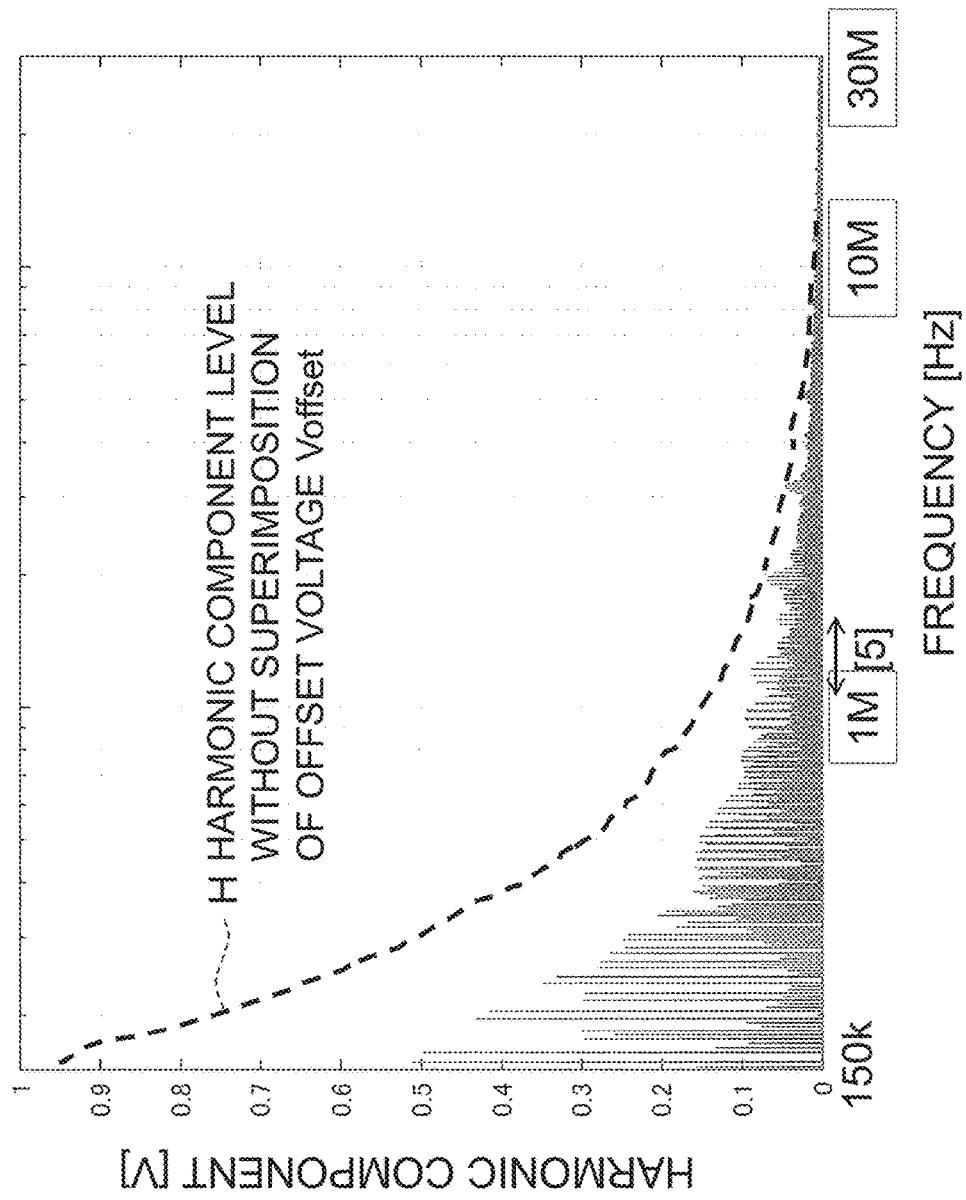
FIG. 16 is a graph for showing a frequency analysis result for the three-phase terminal voltage Vu_PWM obtained when the offset voltage is switched among five offset candidate voltages of values different from those in the example of FIG. 9.

Next, a frequency analysis result (analysis frequency range: 150 kHz to 30 MHz) for the three-phase terminal voltage Vu_PWM obtained when the offset voltage Voffset is switched with the use of five offset candidate voltages Voffset1 to Voffset5 (Voffset1=−0.75 V, Voffset2=−0.47 V, Voffset3=0 V, Voffset4=0.47 V, and Voffset5=0.75 V) is shown in FIG. 16.

Also in this example of FIG. 16, through setting the voltage difference small when one offset candidate voltage takes a value relatively close to, that is, near the offset candidate maximum voltage (Voffset5) or the offset candidate minimum voltage (Voffset1), and setting the voltage difference large when another offset candidate voltage takes a value relatively close to an offset candidate average voltage (0 V), the harmonic voltages are improved especially in the bands over 1 MHz (in particular, a band [5]) as compared to the case in which the number of offset candidate voltages is five and the voltage difference is constant, which is shown in FIG. 9.

From the above description, in terms of a difference between any one offset candidate voltage and one offset candidate voltage having a voltage value closest to that of the any one offset candidate voltage of the n offset candidate voltages (n: natural number of five or more), through setting values of the n offset candidate voltages such that at least one of (n−1) voltage differences that exist among the n offset candidate voltages is different, the harmonic components can be further reduced.

Moreover, through setting small a voltage difference between one offset candidate voltage and an offset candidate voltage having a value closest to that of the one offset candidate voltage when the one offset candidate voltage takes a value relatively close to the offset candidate maximum voltage or the offset candidate minimum voltage, while setting large a voltage difference between another offset candidate voltage and an offset candidate voltage having a value closest to that of the another offset candidate voltage when the another offset candidate voltage takes a value relatively close to an average value of the n offset candidate voltages, the harmonic voltages can be further suppressed.

Second Embodiment

Figure 17:
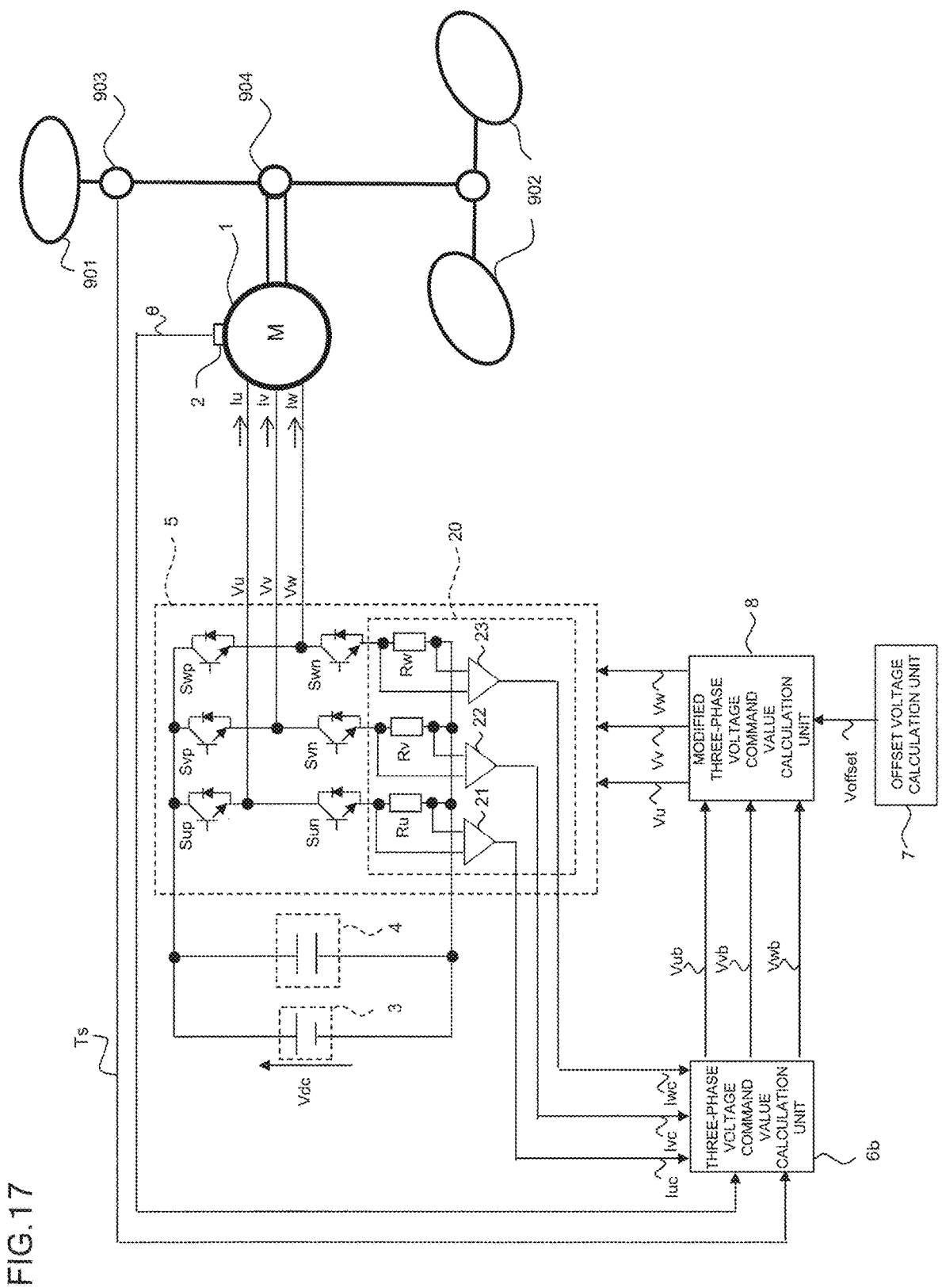
FIG. 17 is an overall configuration diagram for illustrating a motor control device according to a second embodiment of the present invention.

Description is omitted for duplicate parts of the first embodiment. FIG. 17 is a diagram for illustrating an overall configuration in the second embodiment, and is different from FIG. 1, in which the overall configuration in the first embodiment is illustrated, in that a current detector 20 is provided, and in that a three-phase voltage command value calculation unit 6b is used instead of the three-phase voltage command value calculation unit 6a.

The current detector 20 is configured to detect motor currents Iu, Iv, and Iw flowing through U-, V-, and W-phase windings of the motor 1 to output detection values Iuc, Ivc, and Iwc to the three-phase voltage command value calculation unit 6b, which is to be described later. In the current detector 20, current detecting resistance elements Ru, Rv, and Rw are arranged in series with lower-arm switching elements Sun, Svn, and Swn of the inverter 5, respectively, and voltages across the current detecting resistance elements Ru, Rv, and Rw are detected with the use of amplifiers 21, 22, and 23 to detect the motor currents Iu, Iv, and Iw as the detection values Iuc, Ivc, and Iwc, respectively.

The three-phase voltage command value calculation unit 6b is configured to calculate three-phase voltage command values Vub, Vvb, and Vwb for controlling the motor 1 to be in a desired state for output, based on the steering torque Ts of the driver, which is output from the torque detector 903, the rotor magnetic pole position θ, which is output from the rotational position detector 2, and the motor current detection values Iuc, Ivc, and Iwc.

Now, the calculation method is described in detail.

A current command value id_target for the d-axis of the motor 1 is set to "0", and a current command value iq_target for the q-axis is set using the steering torque Ts as in the following equation (2-1), similarly to the equation (1-1) given above.

$$iq\_target = ka \cdot Ts \qquad \text{Equation (2-1)}$$

In the equation, ka is a constant, but may be set to be varied in accordance with the steering torque Ts and a travel speed of an automobile. In this case, iq_target is determined by the above-mentioned equation (2-1), but may be set based on known compensation control depending on a steering state.

Next, based on the motor currents Iuc, Ivc, and Iwc, which are detected by the current detector 20, and the rotor magnetic pole position θ, motor currents id and iq on two rotational axes (d-q) are determined by the following equation (2-2).

$$\begin{pmatrix} i_d \\ i_q \end{pmatrix} = \frac{\sqrt{2}}{\sqrt{3}} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \end{bmatrix} \begin{bmatrix} I_{uc} \\ I_{vc} \\ I_{wc} \end{bmatrix} \quad \text{Equation (2-2)}$$

Next, based on the current command value id_target and the motor current id for the d-axis, the voltage command value Vd for the d-axis is calculated by the following equation (2-3).

$$V_d = k_d\left(1 + \frac{1}{T_d s}\right)(i_{d\_target} - id) \qquad \text{Equation (2-3)}$$

In the equation (2-3), kd and Td are a proportional gain and an integral time constant, respectively, and are only required be determined based on a desired response of the motor current id to the current command value id_target.

Next, based on the current command value iq_target and the motor current iq for the q-axis, the voltage command value Vq for the q-axis is calculated by the following equation (2-4).

$$V_d = k_q\left(1 + \frac{1}{T_q s}\right)(i_{q\_target} - iq) \qquad \text{Equation (2-4)}$$

In the equation (2-4), kq and Tq are a proportional gain and an integral time constant, respectively, and are only required be determined based on a desired response of the motor current iq to the current command value iq_target.

Next, with the use of the voltage command value Vd for the d-axis, the voltage command value Vq for the q-axis, and the rotor magnetic pole position θ described above, the three-phase voltage command values Vub, Vvb, and Vwb are calculated by the following equation (2-5).

$$\begin{pmatrix} v_{ub} \\ v_{vb} \\ v_{wb} \end{pmatrix} = \frac{\sqrt{2}}{\sqrt{3}} \begin{bmatrix} \cos(\theta) & -\sin(\theta) \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_d \\ v_q \end{bmatrix} \quad \text{Equation (2-5)}$$

Similarly to the first embodiment, for the purpose of improving a voltage utilization rate of the inverter 5, three-phase voltage command values Vub', Vvb', and Vwb', which are obtained by performing modulation processing on the three-phase voltage command values Vub, Vvb, and Vwb with the use of a two-phase modulation method, a modulation method in which third harmonic components of the three-phase voltage command values Vub, Vvb, and Vwb are superimposed, or other known technology, may be output.

Now, detection timings of the motor currents in the current detector 20 in the second embodiment are described.

In the motor current detection by the current detector 20, in the phase U, an electric current that flows through the current detecting resistance element Ru when the lower-arm switching element Sun is turned on is equal to the U-phase motor current Iu. Therefore, the U-phase motor current Iu can be detected at any timing when the U-phase lower-arm switching element Sun is on. Similarly, the V-phase motor current Iv can be detected at any timing when the V-phase lower-arm switching element Svn is on. Similarly, the W-phase motor current Iw can be detected at any timing when the W-phase lower-arm switching element Swn is on.

However, in the second embodiment, the detection of the motor currents by the current detector 20 is performed near a maximum value of a PWM carrier wave of the inverter 5. The effect is described below.

Figure 18:
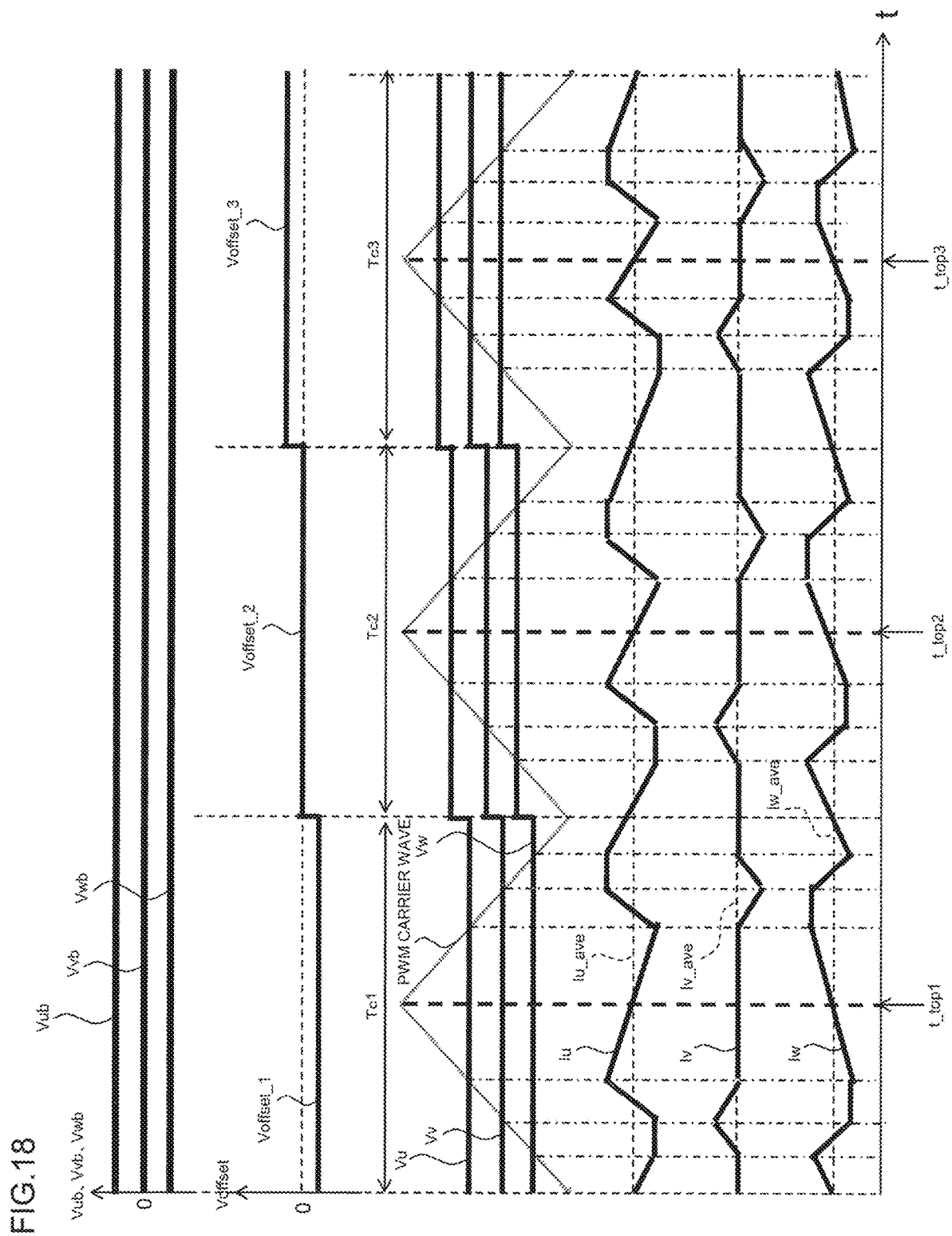
FIG. 18 is time charts of three-phase voltage command values, an offset voltage, modified three-phase voltage command values, and motor currents during three periods of a PWM carrier wave in the second embodiment of FIG. 17.

FIG. 18 is time charts of the three-phase voltage command values Vub, Vvb, and Vwb, an offset voltage Voffset, modified three-phase voltage command values Vu, Vv, and Vw, and the motor currents Iu, Iv, and Iw in three periods of the PWM carrier wave. The PWM carrier wave has periods Tc1=Tc2=Tc3, that is, the PWM carrier wave is a triangle wave having a single period. In FIG. 18, when attention is focused on the motor currents Iu, Iv, and Iw, the motor currents Iu, Iv, and Iw contain ripple components with respect to average values Iu_ave, Iv_ave, and Iw_ave thereof.

In this case, when the detection of the motor currents is performed at timings (t_top1, t_top2, and t_top3) at which the PWM carrier wave is at its maximum, the detected motor currents Iuc, Ivc, and Iwc match Iu_ave, Iv_ave, and Iw_ave, respectively. Therefore, through performing the detection of the motor currents at the timings when the PWM carrier wave is at the maximum, fundamental components of the motor currents can be detected from the motor currents containing the ripple components.

In electric power steering control, stability of a current controller is of top importance. In order to ensure stability of current control, it is required to set detection intervals of the motor currents constant. Therefore, in the second embodiment, the period of the PWM carrier wave is set to a triangle wave of a single period, and the motor currents are detected near the maximum value of the PWM carrier wave. With the period of the PWM carrier wave being set to the single period, a period between the vicinity of the maximum value of the PWM carrier wave and the vicinity of a maximum value of the PWM carrier wave in the next period always becomes constant, with the result that the motor currents can be detected at a constant period, and the stability of the current controller can be ensured.

Next, in the electric power steering control, it is required to detect the motor currents with high accuracy. This is because, when the detected motor currents have errors from true values thereof, the current controller performs control so as to match the motor currents having the errors to the current command values, and as a result, torque ripple is generated from the motor 1, and is transmitted to the steering wheel 901 via the gear 904 to reduce the driver's steerability.

To address this problem, in the second embodiment, through setting the current detection timing to near the maximum value of the PWM carrier wave, fundamental waves (Iu_ave, Iv_ave, and Iw_ave) of the motor currents (Iu, Iv, and Iw) can be detected from the motor currents (Iu, Iv, and Iw) containing the ripple components as shown in FIG. 18. Therefore, the motor currents can be detected with high accuracy, and the torque ripple is not generated by the motor 1, with the result that the driver's good steerability of the steering wheel can be obtained.

In contrast, in the methods in which the period of the PWM carrier wave is varied as in Patent Literature 1 and Patent Literature 2, when the detection intervals of the motor currents are set constant in order to ensure the stability of the current controller, the motor currents cannot always be detected near the maximum value of the PWM carrier wave, and errors due to the ripple components occur in the detected motor currents, with the result that the steerability of the steering wheel is reduced. Moreover, when the motor currents are detected at timings near the maximum value of the PWM carrier wave in order to detect the motor currents with high accuracy, the period of the PWM carrier wave is varied, and hence the detection intervals for the motor currents become inconstant, with the result that stable current control cannot be achieved. When the period of the PWM carrier wave becomes longer, in particular, the detection intervals of the motor currents become longer, and the current control becomes unstable.

From the above description, in the second embodiment, with the configuration in which the period of the PWM carrier wave is set to the triangle wave of the single period, the timings to detect the motor currents by the current detector are set to near the maximum value of the PWM carrier wave, and the three-phase voltage command values are calculated by the three-phase voltage command value calculation unit based on the motor currents detected at the timings, there is obtained a significant and hitherto unknown effect that the noise reduction effect described in the first embodiment is obtained while the stability of the current control and the steerability of the steering wheel are maintained.

Third Embodiment

Figure 19:
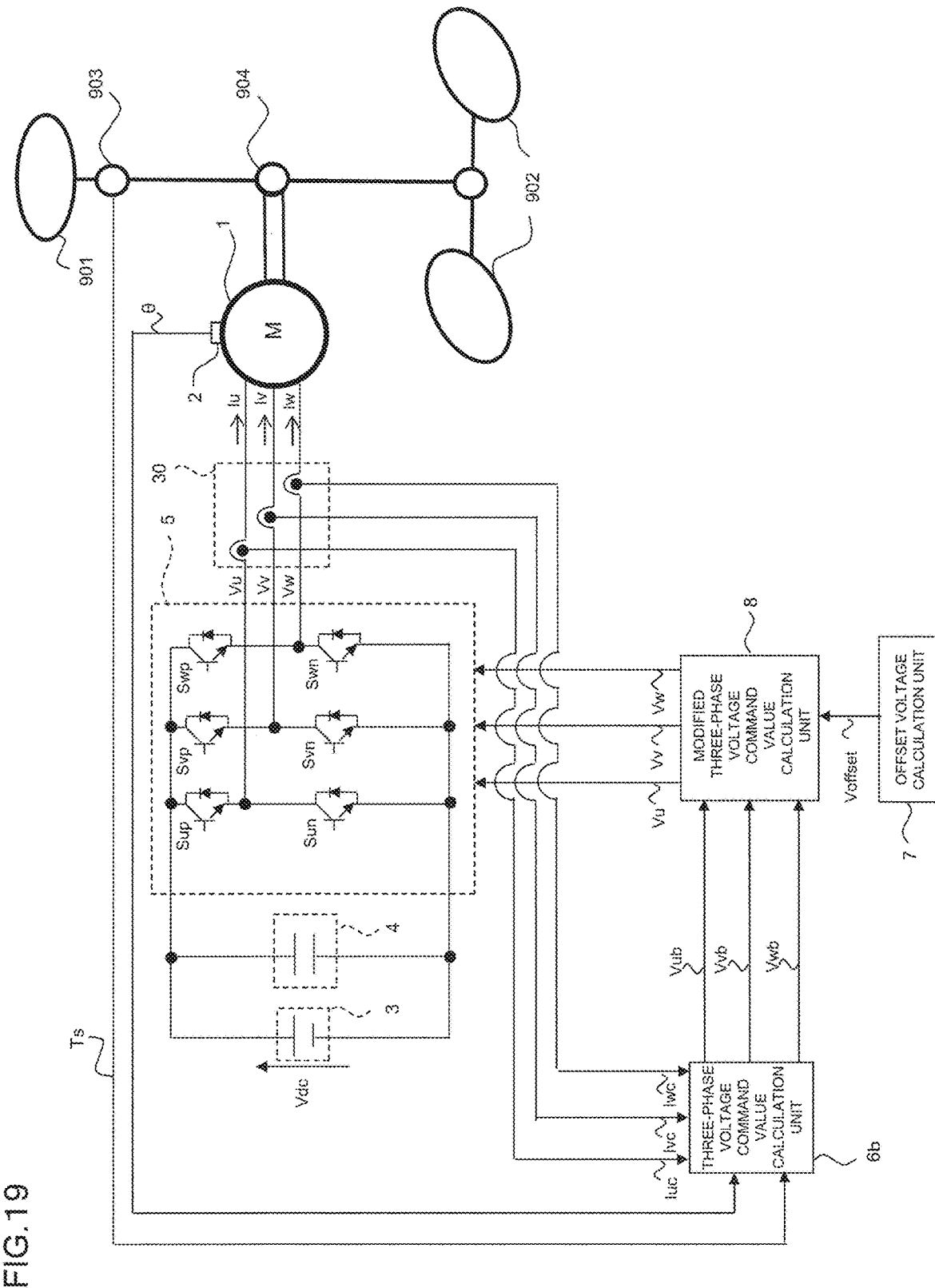
FIG. 19 is an overall configuration diagram for illustrating a motor control device according to a third embodiment of the present invention.

Description is omitted for duplicate parts of the second embodiment. FIG. 19 is a diagram for illustrating an overall configuration in the third embodiment, and is different from FIG. 17, in which the overall configuration in the second embodiment is illustrated, in that a current detector 30 is provided.

The current detector 30 is configured to detect motor currents Iu, Iv, and Iw flowing through U-, V-, and W-phase terminals between the inverter 5 and the motor 1 to output detection values Iuc, Ivc, and Iwc to the three-phase voltage command value calculation unit 6b.

Now, acquisition timings of the motor currents in the current detector 30 in the third embodiment are described.

The motor current detection by the current detector 30 can be performed at any timing. However, in the third embodiment, the motor current detection by the current detector 30 is performed near a maximum value or near a minimum value of the PWM carrier wave of the inverter 5.

The effect is described below.

Figure 20:
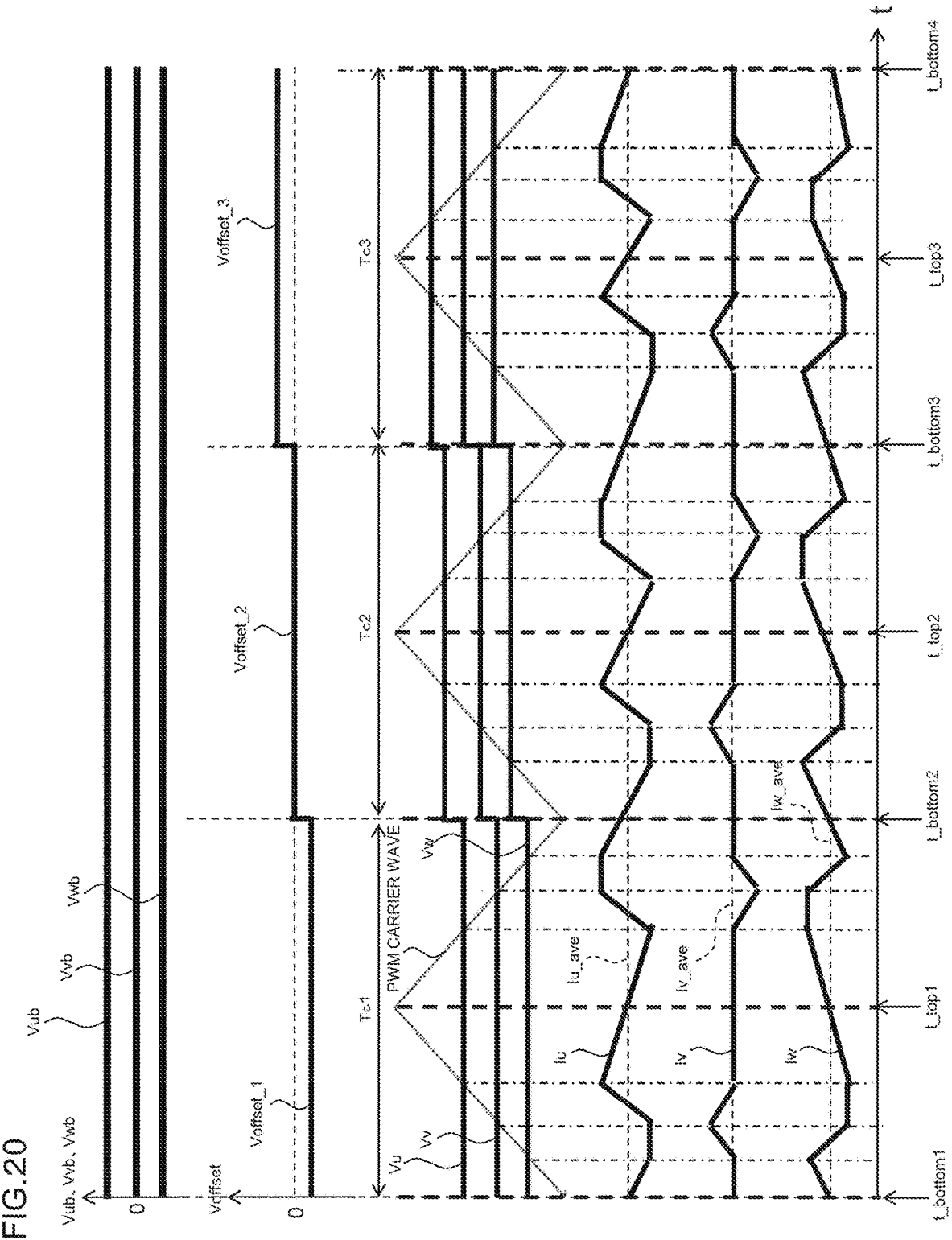
FIG. 20 is time charts of three-phase voltage command values, an offset voltage, modified three-phase voltage command values, and motor currents during three periods of a PWM carrier wave in the third embodiment of FIG. 19.

FIG. 20 is temporal waveforms of the three-phase voltage command values Vub, Vvb, and Vwb, an offset voltage Voffset, modified three-phase voltage command values Vu, Vv, and Vw, and the motor currents Iu, Iv, and Iw in three periods of the PWM carrier wave. The PWM carrier wave has periods Tc1=Tc2=Tc3, that is, the PWM carrier wave is a triangle wave having a single period. In FIG. 20, when attention is focused on the motor currents Iu, Iv, and Iw, the motor currents Iu, Iv, and Iw contain ripple components with respect to average values Iu_ave, Iv_ave, and Iw_ave thereof.

From the above description, in the third embodiment, with the configuration in which the period of the PWM carrier wave is set to the triangle wave of the single period, the timings to detect the motor currents by the current detector are set to near the maximum value or near the minimum value of the PWM carrier wave, and the three-phase voltage command values are calculated by the three-phase voltage command value calculation unit based on the motor currents detected at the timings, there is obtained a significant and hitherto unknown effect that the noise reduction effect described in the first embodiment is obtained while the stability of the current control and the steerability of the steering wheel through the accurate detection of the motor currents are maintained.

Fourth Embodiment

Figure 21:
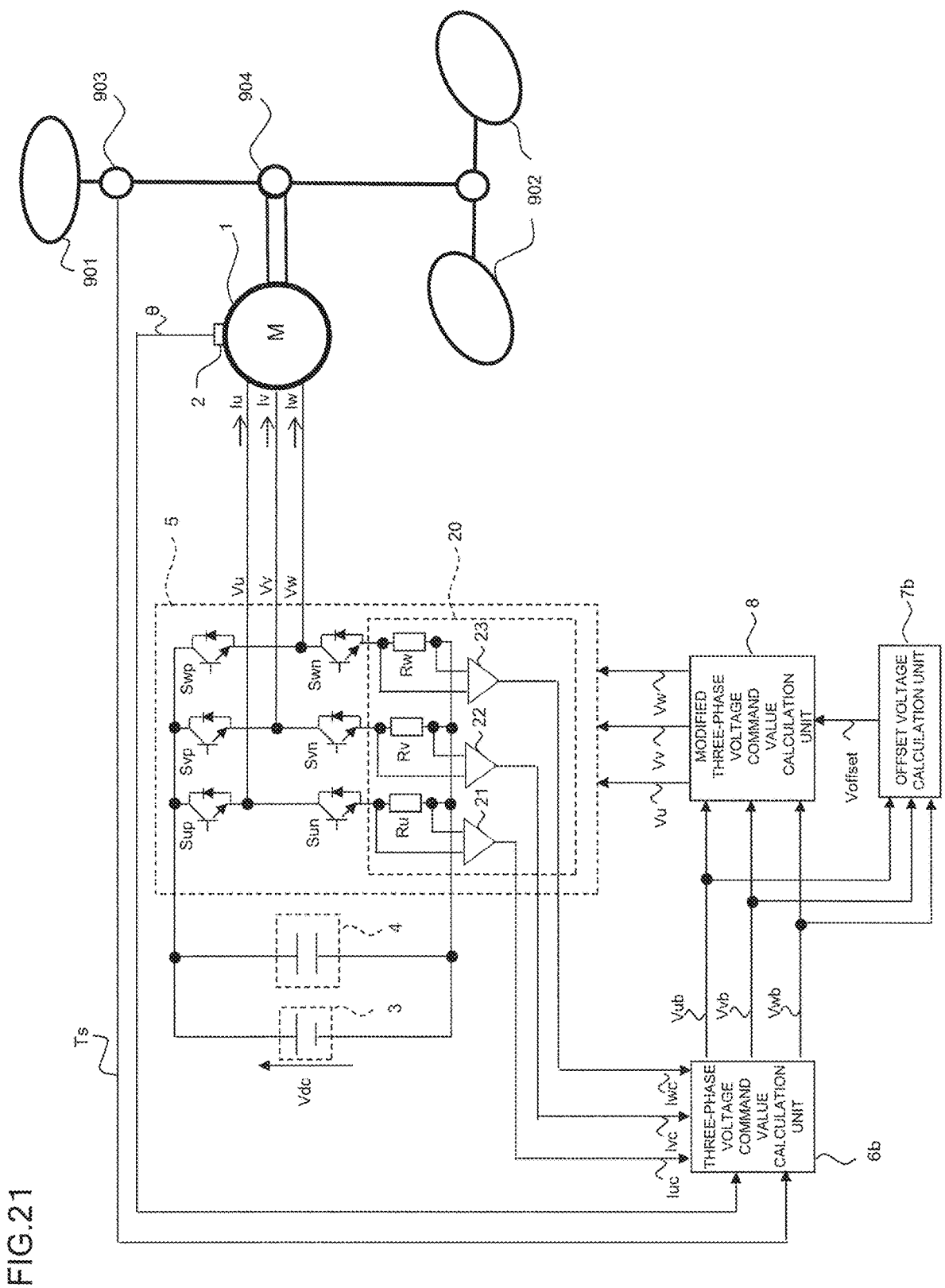
FIG. 21 is an overall configuration diagram for illustrating a motor control device according to a fourth embodiment of the present invention.

Description is omitted for duplicate parts of the first to third embodiments. FIG. 21 is a diagram for illustrating an overall configuration in the fourth embodiment, and is different from FIG. 17, in which the overall configuration in the second embodiment described above is illustrated, in that an offset voltage calculation unit 7b is used instead of the offset voltage calculation unit 7.

The offset voltage calculation unit 7b is different from the offset voltage calculation unit 7 in the second embodiment in that the three-phase voltage command values (Vub, Vvb, and Vwb) are input thereto, a modulation ratio is calculated based on the three-phase voltage command values (Vub, Vvb, and Vwb), and when the modulation ratio exceeds a predetermined modulation ratio threshold value, an offset voltage Voffset is set to zero. The calculation is described below.

With the use of the three-phase voltage command values (Vub, Vvb, and Vwb) input to the offset voltage calculation unit 7b, the voltage modulation ratio m is calculated by the calculation of the following equation (4-1).

$$m = \frac{\sqrt{v_{ub}^2 + v_{vb}^2 + v_{wb}^2}}{V_{dc}/\sqrt{2}} \quad \text{Equation (4-1)}$$

Next, the voltage modulation ratio m calculated by the above-mentioned equation (4-1) is compared to a modulation ratio threshold value m_base. When the voltage modulation ratio m is larger than the modulation ratio threshold value m_base, an offset voltage Voffset is set to zero. In contrast, when the voltage modulation ratio m is the modulation ratio threshold value m_base or less, the offset voltage is switched and selected from offset candidate voltages for output as in the offset voltage calculation unit 7.

In this case, the modulation ratio threshold value m_base may be set such that, when the offset candidate voltages are superimposed as the offset voltage, modified three-phase voltage command values fall in a range of a maximum value of the PWM carrier wave or more and a minimum value of the PWM carrier wave or less. Moreover, when the square root operation in the above-mentioned equation (4-1) increases computational load of the microcomputer (CPU), it should be understood that there may be adopted a configuration in which a square value of the above-mentioned equation (4-1) is calculated, and the result is compared with a square of the modulation ratio threshold value. Moreover, as the DC voltage Vdc, a detection value from the DC power source 3 or a fixed value (for example, 12 V) may be used.

From the above description, in the fourth embodiment, through setting the offset voltage to zero when the modulation ratio exceeds the modulation ratio threshold value, there is obtained a significant and hitherto unknown effect that the voltage amplitude output from the inverter 5 can be set high while the noise reduction effect in the first to third embodiments described above is maintained.

Fifth Embodiment

Figure 22:
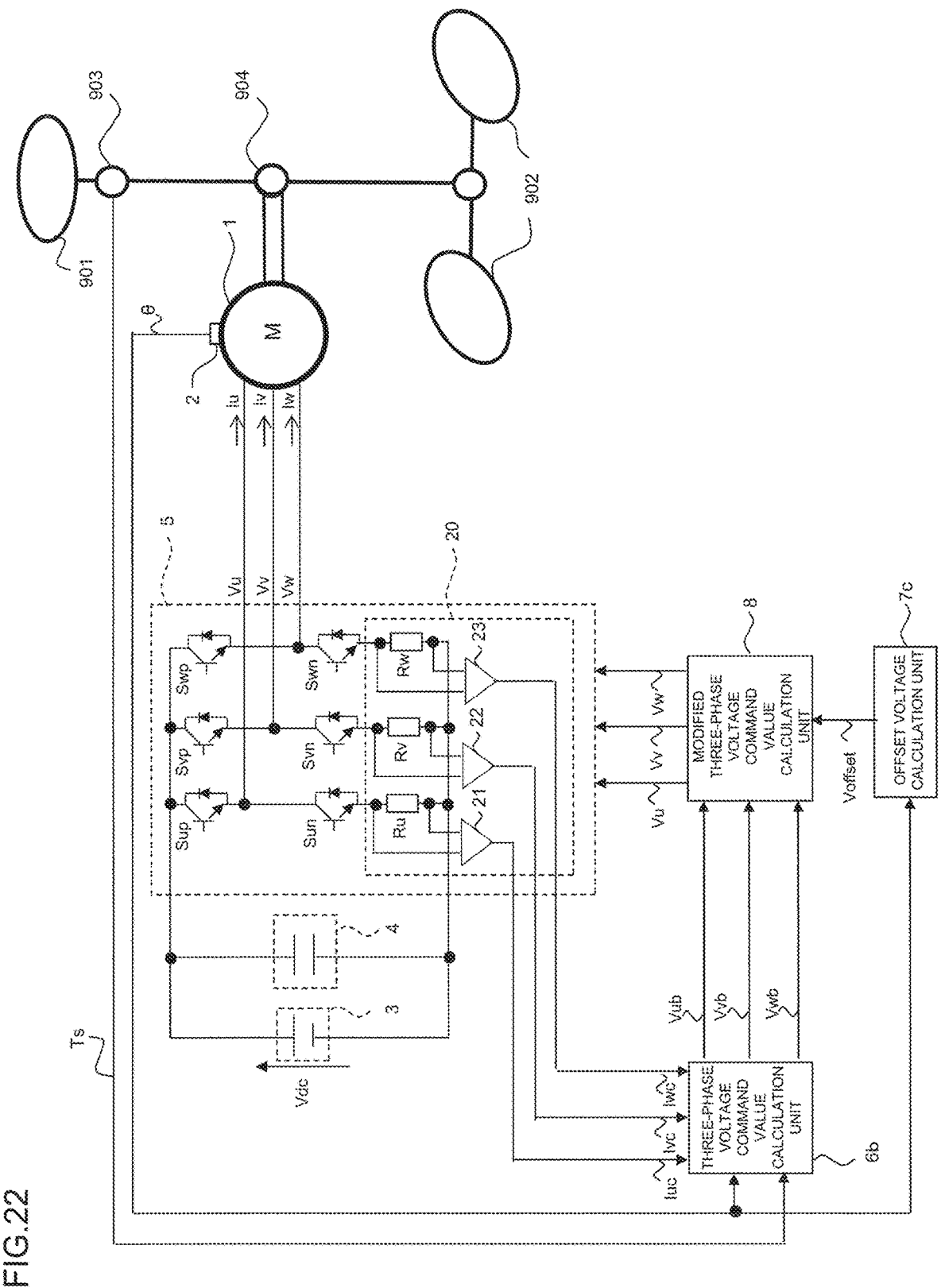
FIG. 22 is an overall configuration diagram for illustrating a motor control device according to a fifth embodiment of the present invention.

Description is omitted for duplicate parts of the first to fourth embodiments. FIG. 22 is a diagram for illustrating an overall configuration in the fifth embodiment, and is different from FIG. 17, in which the overall configuration in the second embodiment is illustrated, in that an offset voltage calculation unit 7c is used instead of the offset voltage calculation unit 7.

The offset voltage calculation unit 7c is different from the offset voltage calculation unit 7 in the second embodiment in that the rotor magnetic pole position θ is detected, a motor rpm is calculated based on the rotor magnetic pole position θ, and when the motor rpm exceeds a predetermined rpm threshold value, an offset voltage Voffset is set to zero. The calculation is described below.

With the use of the rotor magnetic pole position θ (rotor magnetic pole positions θ for the x-th and (x−1)-th samples are represented by θ(x) and θ(x−1), respectively) input to the offset voltage calculation unit 7c, an rpm N is calculated by the calculation of the following equation (5-1).

$$N = \frac{\theta(x) - \theta(x-1)}{T_c} \quad \text{Equation (5-1)}$$

In the equation, Tc is a detection period of the rotor magnetic pole position.

Next, the rpm N calculated by the above-mentioned equation (5-1) is compared to an rpm threshold value N_base. When the rpm N is larger than the rpm threshold value N_base, an offset voltage Voffset is set to zero. In contrast, when the rpm N is the rpm threshold value N_base or less, the offset voltage is switched and selected from offset candidate voltages for output as in the offset voltage calculation unit arm switching element 7.

In this case, the rpm threshold value N_base may be set to a value at which voltage variation values at a predetermined time (for example, 20 ms) of the three-phase voltage command values Vub, Vvb, and Vwb at the rpm threshold value N_base are equal to or larger than a difference between the offset candidate maximum voltage and the offset candidate minimum voltage.

From the above description, in the fifth embodiment, through setting the offset voltage to zero when the rpm exceeds the rpm threshold value, there is obtained a significant and hitherto unknown effect that the voltage amplitude output from the inverter 5 can be set high while the noise reduction effect in the first to third embodiments is maintained.

Sixth Embodiment

Description is omitted for duplicate parts of the first to fifth embodiments. In the sixth embodiment, in FIG. 17 in which the overall configuration in the second embodiment is illustrated, three-phase voltage command values Vub, Vvb, and Vwb are calculated by the three-phase voltage command value calculation unit 6b so as to secure a conduction period of lower-arm switching elements Sun, Svn, and Swn of the inverter 5, during which the motor currents Iu, Iv, and Iw can be detected by current detecting resistance elements Ru, Rv, and Rw included in the current detector 20. Then, in the three-phase voltage command value calculation unit 6b, with the use of the three-phase voltage command values (Vub, Vvb, and Vwb), the voltage modulation ratio m is calculated by the calculation of the following equation (6-1).

$$m = \frac{\sqrt{v_{ub}^2 + v_{vb}^2 + v_{wb}^2}}{V_{dc}/\sqrt{2}} \qquad \text{Equation (6-1)}$$

Next, a modulation ratio threshold value m_base2 is described. When a proportion of an on-time of the lower-arm switching elements of a lower-limit value Ton of the inverter 5, during which the motor currents are detectable by the current detecting resistance elements, to the period Tc of the PWM carrier wave is represented by m_low_on, and a proportion of a difference between the offset candidate maximum voltage and the offset candidate minimum voltage to the DC voltage Vdc is represented by m_offset, the modulation ratio threshold value m_base2 can be expressed by the following equation (6-2).

$$m\_base2 = 1 - m\_low\_on - m\_offset \qquad \text{Equation (6-2)}$$

Next, the voltage modulation ratio m calculated by the above-mentioned equation (6-1) is compared to the modulation ratio threshold value m_base2 calculated by the above-mentioned equation (6-2), and when m≤m_base2, the three-phase voltage command values Vub, Vvb, and Vwb are directly output to the modified three-phase voltage command value calculation unit 8. In contrast, when m>m_base2, the calculations of the following equations (6-3) to (6-5) are performed on the three-phase voltage command values Vub, Vvb, and Vwb, respectively, to output three-phase voltage command values Vub', Vvb', and Vwb' to the modified three-phase voltage command value calculation unit 8.

$$Vub' = Vub \times m\_base2 \div m \qquad \text{Expression (6-3)}$$

$$Vvb' = Vvb \times m\_base2 \div m \qquad \text{Expression (6-4)}$$

$$Vwb' = Vwb \times m\_base2 \div m \qquad \text{Expression (6-5)}$$

The three-phase voltage command values Vub', Vvb', and Vwb' calculated by the above-mentioned equations (6-3) to (6-5) are limited to the modulation ratio threshold value m_base2 in voltage modulation ratio. Therefore, even when the offset voltage Voffset is added to the three-phase voltage command values Vub', Vvb', and Vwb', modified three-phase voltage command values Vu, Vv, and Vw with which the lower-limit value Ton of the on-time of the lower-arm switching elements of the inverter 5, during which the motor currents are detectable by the current detecting resistance elements, can be secured are output.

As described above, in the sixth embodiment, through setting the modulation ratio (amplitude) of the three-phase voltage command values such that the conduction period, during which the motor currents are detectable by the current detecting resistance elements arranged in series with the lower-arm switching elements of the inverter, there is obtained a significant and hitherto unknown effect that the current control based on the motor currents detected by the current detector can be performed while the effect of suppressing noise through the addition of the offset voltage is maintained.

Seventh Embodiment

Figure 23:
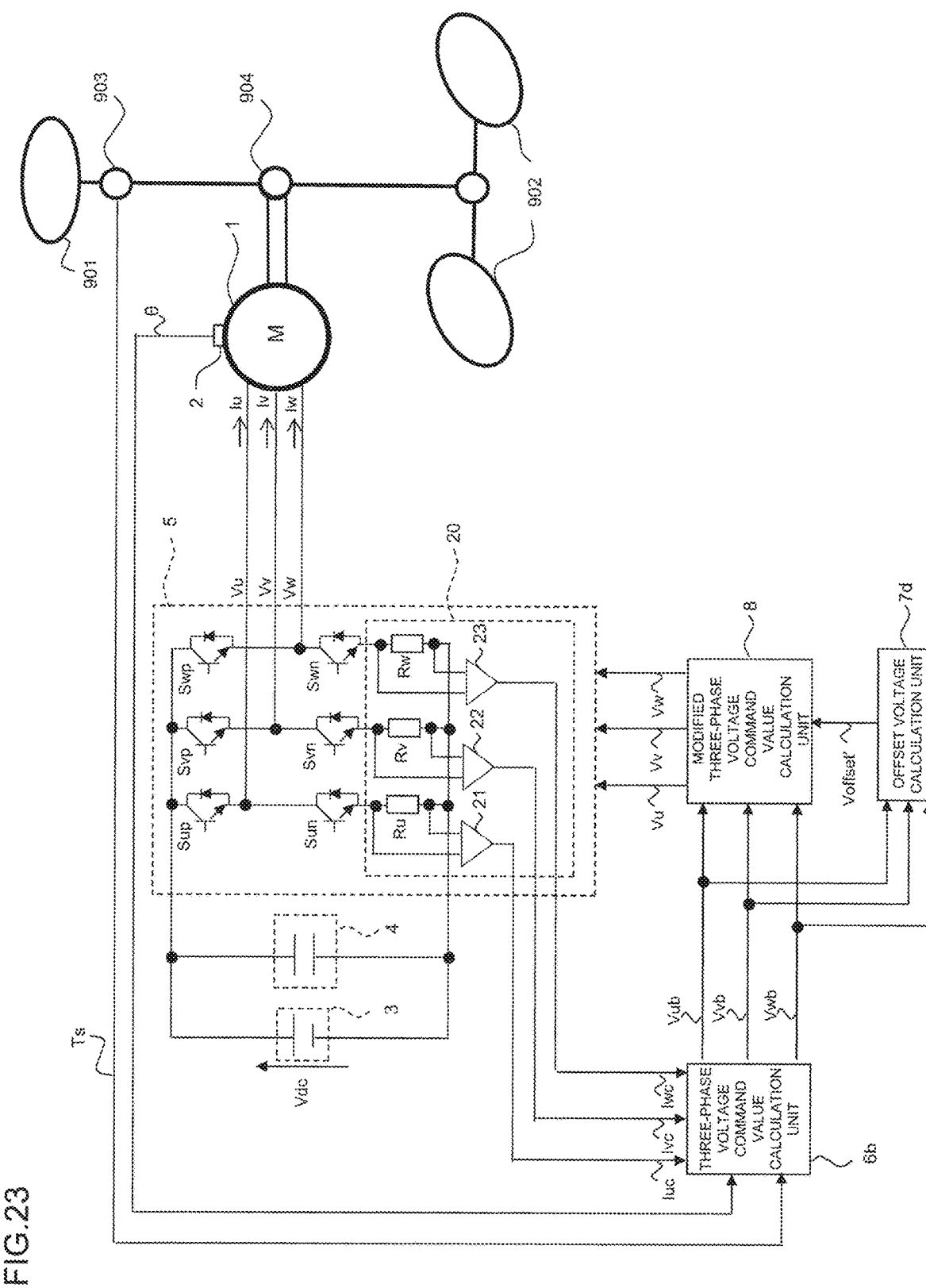
FIG. 23 is an overall configuration diagram for illustrating a motor control device according to a seventh embodiment of the present invention.

Description is omitted for duplicate parts of the first to sixth embodiments. FIG. 23 is a diagram for illustrating an overall configuration in the seventh embodiment, and is different from FIG. 17, in which the overall configuration in the second embodiment is illustrated, in that an offset voltage calculation unit 7d is used instead of the offset voltage calculation unit 7.

The offset voltage calculation unit 7d is different from the offset voltage calculation unit 7 in the second embodiment in that the three-phase voltage command values (Vub, Vvb, and Vwb) are input thereto, a modulation ratio is calculated based on the three-phase voltage command values (Vub, Vvb, and Vwb), and an offset voltage Voffset is calculated based on a difference between the modulation ratio and a modulation ratio m_c (hereinafter referred to as a "current detecting upper limit modulation ratio") with which a conduction period of the lower arm of the inverter 5, during which the motor currents are detectable by the current detecting resistance elements Ru, Rv, and Rw, is secured. The calculation is described below.

First, with the use of the three-phase voltage command values (Vub, Vvb, and Vwb), the modulation ratio m is calculated by the calculation of the following equation (7-1).

$$m = \frac{\sqrt{v_{ub}^2 + v_{vb}^2 + v_{wb}^2}}{V_{dc}/\sqrt{2}} \qquad \text{Equation (7-1)}$$

Next, the current detecting upper limit modulation ratio m_c is calculated by the following equation (7-2) with the use of the lower-limit value Ton of the on-time of the lower-arm switching elements of the inverter 5, during which the motor currents are detectable by the current detecting resistance elements Ru, Rv, and Rw, and the period Tc of the PWM carrier wave.

$$m\_c = 1 - Ton/Ts \qquad \text{Equation (7-2)}$$

Next, a proportion of a difference between the offset candidate maximum voltage and the offset candidate minimum voltage to the DC voltage Vdc is represented by m_offset. Then, when the following equation (7-3) is satisfied, an offset voltage Voffset' to be output to the modified three-phase voltage command value calculation unit 8 is given by the following equation (7-4). It should be noted, however, that the offset voltage Voffset is calculated by switching and selecting from the offset candidate voltages of the offset correction calculation unit 7 in the first embodiment.

$$m\_c < m + m\text{offset} \qquad \text{Equation (7-3)}$$

$$V\text{offset}' = V\text{offset} \times (m\_c - m) + m\text{offset} \qquad \text{Equation (7-4)}$$

Meanwhile, when the above-mentioned equation (7-3) is not satisfied, the offset voltage Voffset' is given by the following equation (7-5).

$$V\text{offset}' = V\text{offset} \qquad \text{Equation (7-5)}$$

As described above, in the seventh embodiment, through calculating the offset voltage so as to secure the conduction period, during which the motor currents are detectable by the current detecting resistance elements arranged in series with the lower-arm switching elements of the inverter, there is obtained a significant and hitherto unknown effect that the current control based on the motor currents detected by the current detector can be performed so as not to affect the amplitude (modulation ratio) of the three-phase voltage command values Vub, Vvb, and Vwb by the addition of the offset voltage.

Eighth Embodiment

Figure 24:
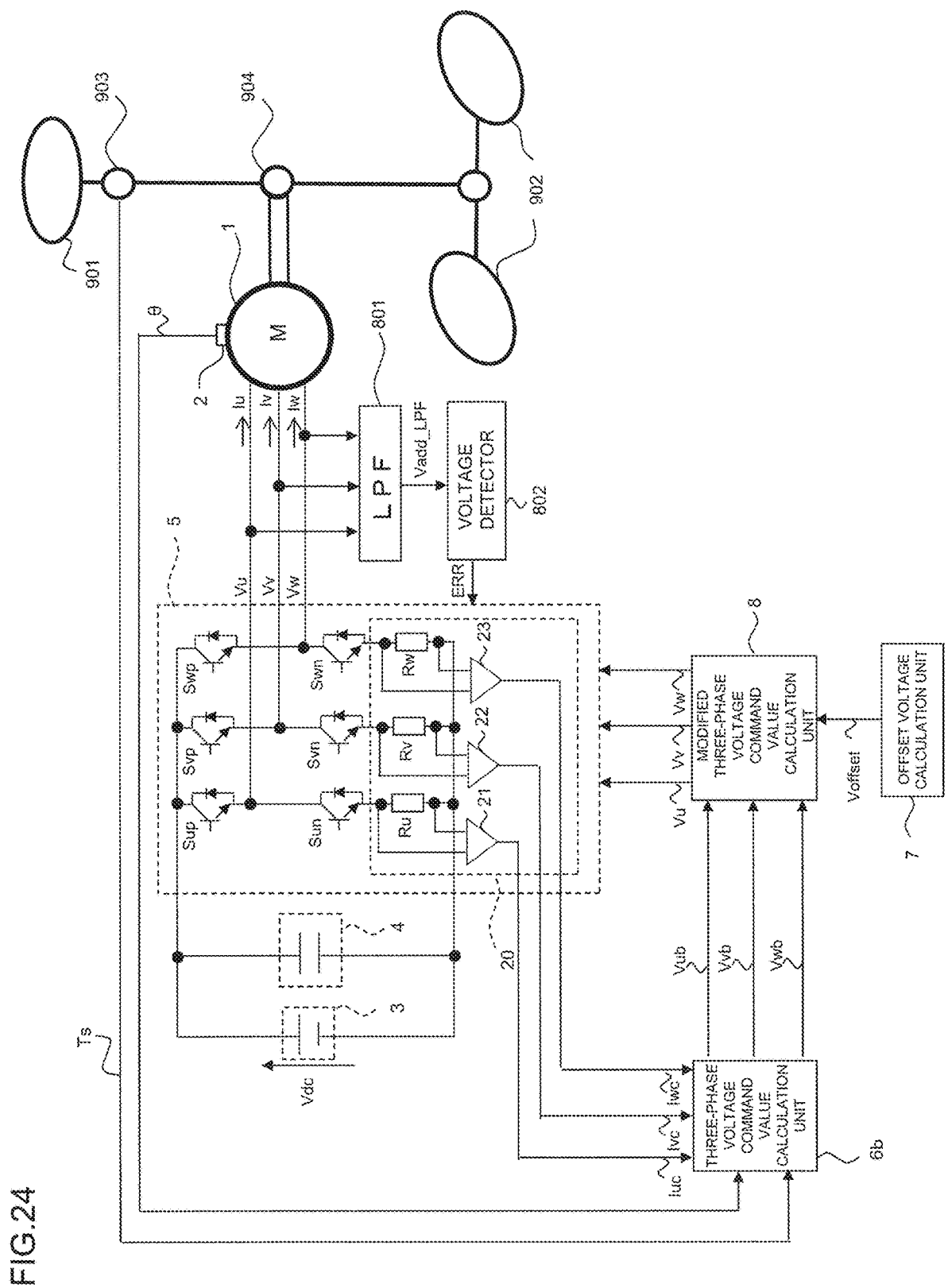
FIG. 24 is an overall configuration diagram for illustrating a motor control device according to an eighth embodiment of the present invention.

Description is omitted for duplicate parts of the first to seventh embodiments. FIG. 24 is a diagram for illustrating an overall configuration in the eighth embodiment, and is different from FIG. 17, in which the overall configuration in the second embodiment is illustrated, in that a low-pass filter 801 and a voltage detector 802 are added.

Figure 25:
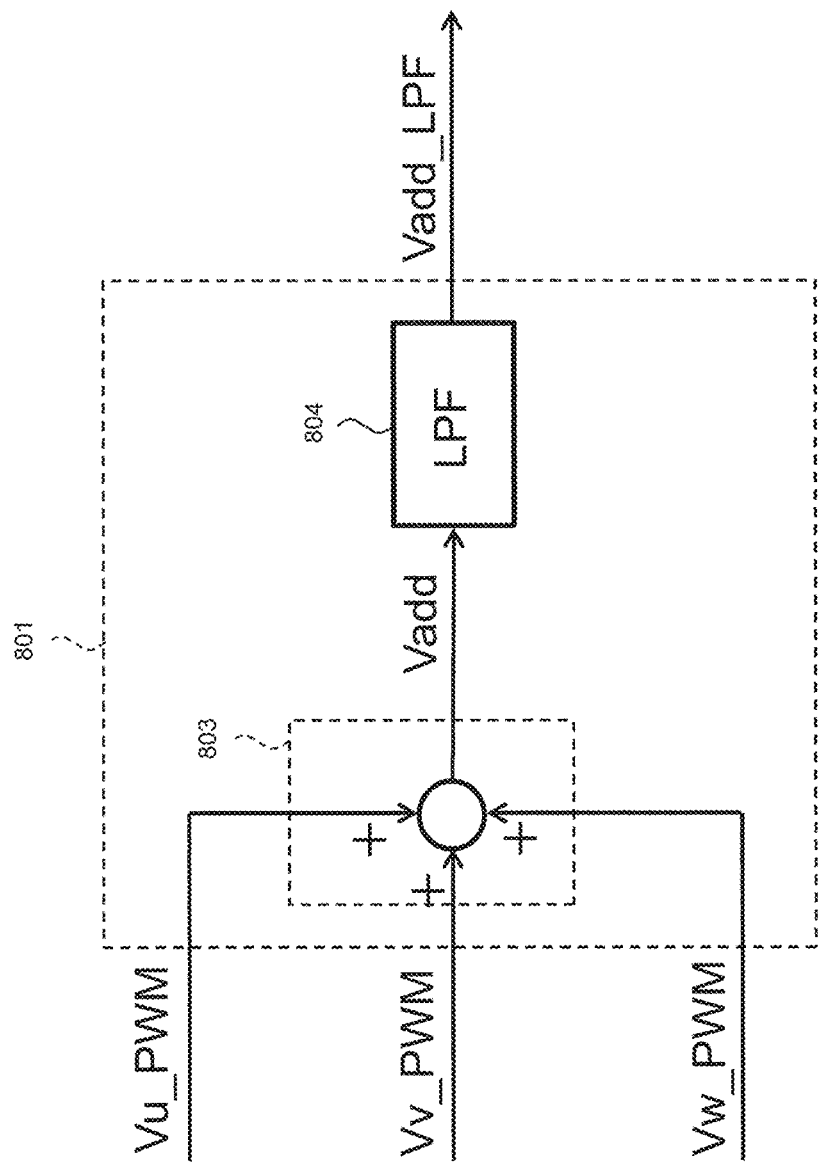
FIG. 25 is a block diagram for illustrating a configuration of a low-pass filter used in the eighth embodiment illustrated in FIG. 24.

As illustrated in FIG. 25, the low-pass filter 801 is a circuit to which the three-phase terminal voltages (Vu_PWM, Vv_PWM, and Vw_PWM) output by the inverter 5 are input, which is configured to add all phases of the three-phase terminal voltages (Vu_PWM, Vv_PWM, and Vw_PWM) in an adder 803, and then output a sum Vadd_LPF of the three-phase terminal voltages that have been allowed to pass through a low-pass filter 804 having a cutoff frequency fc that is enough to attenuate a frequency component (reciprocal of the PWM carrier wave Ts) of the PWM carrier wave.

Figure 26:
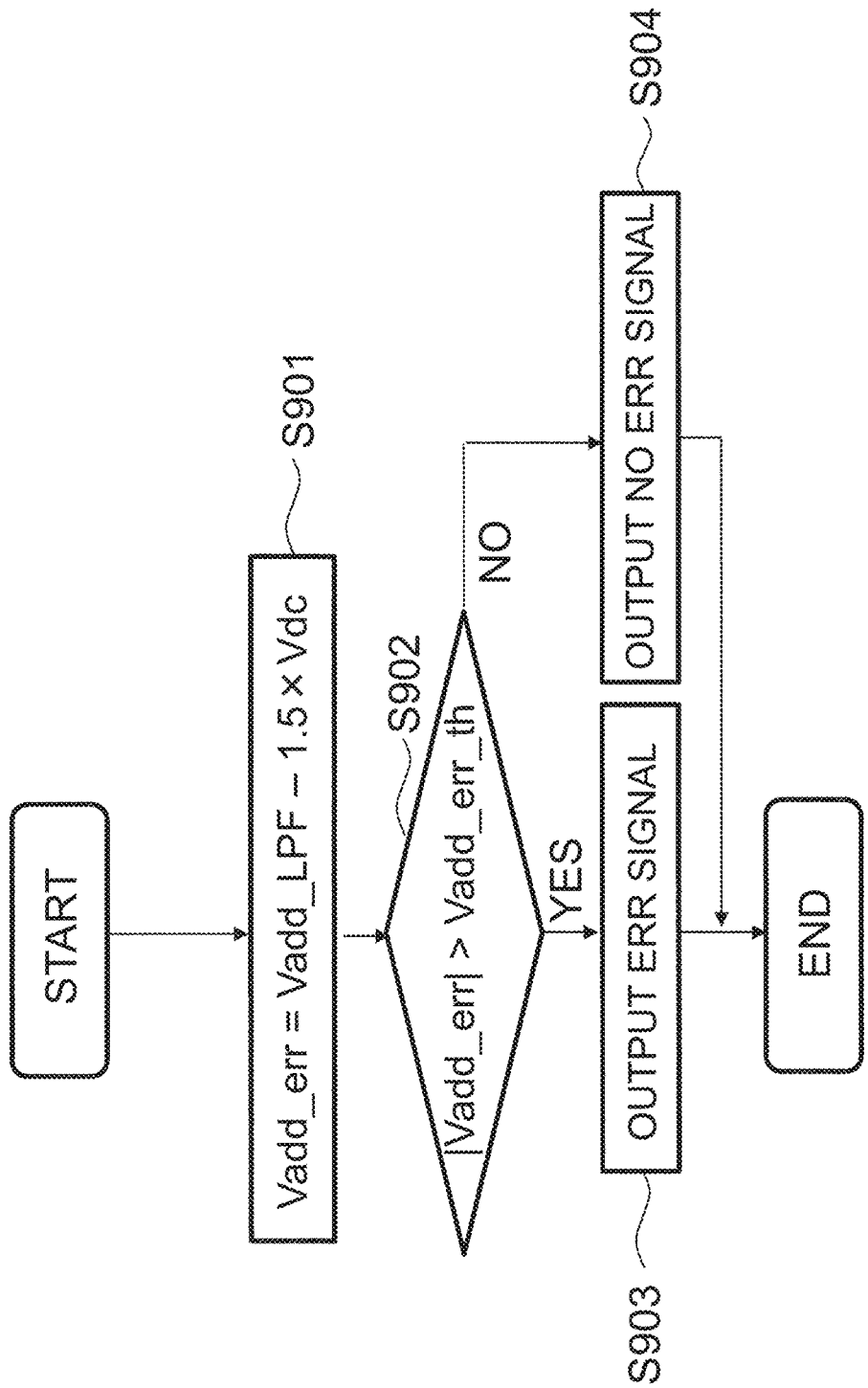
FIG. 26 is a flow chart for illustrating an operation of a voltage detector used in the eighth embodiment of FIG. 24.

Next, an operation of the voltage detector 802 is described with reference to a flow chart of FIG. 26.

In Step S901, a value obtained by subtracting 1.5×Vdc from the sum Vadd_LPF of the three-phase terminal voltages is set as a voltage error Vadd_err. In Step S902, it is determined whether or not an absolute value |Vadd_err| of the sum error Vadd_err determined in Step S901 is larger than a sum error reference value Vadd_err_th. When it is selected that the absolute value |Vadd_err| is larger than the sum error reference value Vadd_err_th (YES) in Step S902, an ERR signal is output, and the inverter 5 is stopped (Step S903). In contrast, when it is selected that the absolute value |Vadd_err| is not larger than the sum error reference value Vadd_err_th (NO), no ERR signal is output (Step S904).

Next, the sum Vadd_LPF of the three-phase terminal voltages is described in detail. The three-phase terminal voltages Vu_PWM, Vv_PWM, and Vw_PWM having components in bands of the frequency of the PWM carrier wave or more removed are expressed by the following equations (9-1) to (9-3), respectively.

$$Vu\_PWM = V\text{amp} \times \cos(\theta v) + V\text{offset} + 0.5 \times Vdc \qquad \text{Equation (9-1)}$$

$$Vv\_PWM = V\text{amp} \times \cos(\theta v - 2\pi/3) + V\text{offset} + 0.5 \times Vdc \qquad \text{Equation (9-2)}$$

$$Vw\_PWM = V\text{amp} \times \cos(\theta v + 2\pi/3) + V\text{offset} + 0.5 \times Vdc \qquad \text{Equation (9-3)}$$

In the equations, Vamp represents a voltage amplitude, and θv represents a voltage phase.

From the above-mentioned equations (9-1) to (9-3), a sum Vadd of the three-phase terminal voltages is expressed by the following equation (9-4).

$$Vadd = 3 \times V\text{offset} + 1.5 \times Vdc \qquad \text{Equation (9-4)}$$

Now, regarding the offset voltage Voffset included in the above-mentioned equation (9-4), a frequency corresponding to a selection frequency of each of the n offset candidate voltages forming the offset voltage Voffset is described. A reciprocal of a period from when one offset candidate voltage is selected as the offset voltage to when the offset candidate voltage is selected again as the offset voltage is defined as the "frequency corresponding to the selection frequency of each of the n offset candidate voltages".

For example, in FIG. 3, when the period Tc of the PWM carrier wave is 50 μs, the offset voltage Voffset is switched as: Voffset1, Voffset2, Voffset3, and Voffset1 at intervals of 50 μs, and hence the same offset candidate voltage is output at a period of 150 μs. When a reciprocal of the period is taken, the frequency is 6.6 kHz.

Therefore, the frequency corresponding to the selection frequency of each of the offset candidate voltages obtained when n=3 and when the update period of the of f set candidate voltages is 50 μs is 6.6 kHz. In the example of FIG. 3, the offset voltage Voffset contains a component having the frequency of 6.6 kHz corresponding to the selection frequency of each of the offset candidate voltages as a main component, and also contains higher frequency components.

Therefore, in the eighth embodiment, the frequency corresponding to the selection frequency of each of the n offset candidate voltages is set to be higher than the cutoff frequency of the low-pass filter 804. Then, the first term in the right side of the above-mentioned equation (9-4) is sufficiently attenuated, and the output value Vadd_LPF of the low-pass filter 804 contains only the second term in the right side of the above-mentioned equation (9-4). Therefore, the voltage error Vadd_err caused by the voltage offset Voffset is not generated in the calculation in Step S901 of FIG. 26, and hence there is obtained an effect that the probability of causing erroneous detection of a failure in the inverter 5 can be significantly reduced.

Ninth Embodiment

Description is omitted for duplicate parts of the first to eighth embodiments.

The ninth embodiment is different from the eighth embodiment in a timing to detect the three-phase terminal voltages in a case where the frequency corresponding to the selection frequency of each of then offset candidate voltages is set to be low with respect to the cutoff frequency fc of the low-pass filter 801 in the eighth embodiment, and the difference is described.

Figure 27:
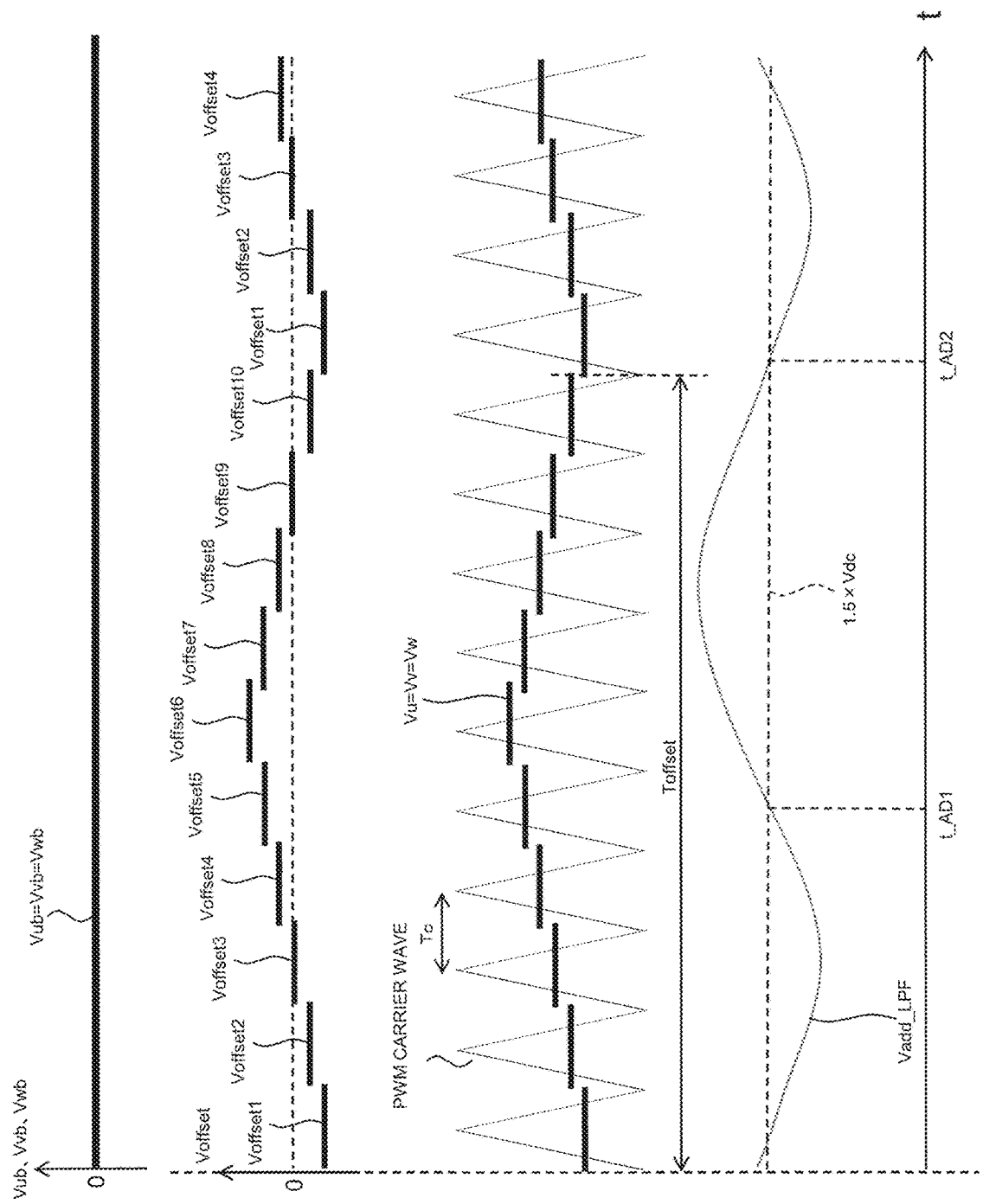
FIG. 27 is time charts of three-phase voltage command values, an offset voltage, a PWM carrier wave, modified three-phase voltage command values, and a sum of three-phase terminal voltages in a ninth embodiment of the present invention.

FIG. 27 is time charts of the three-phase voltage command values Vub, Vvb, and Vwb, the offset voltage Voffset, the PWM carrier wave, the modified three-phase voltage command values Vu, Vv, and Vw, and the sum Vadd_LPF of the three-phase terminal voltages. The three-phase voltage command values are the same voltage (Vub=Vvb=Vwb) for all phases for simplicity. The number n of offset candidate voltages is ten, and the offset voltage is switched among the ten offset candidate voltages for each period of the PWM carrier wave for output. In this case, a period Toffset from when Voffset1 is selected to when Voffset1 is selected again as the offset candidate voltage is 10×Tc, and the frequency corresponding to the selection frequency of each of the offset candidate voltages is 1/(10×Tc).

When the frequency is lower than the cutoff frequency of the low-pass filter 801, a frequency component corresponding to the selection frequency of each of the offset candidate voltages remains in the sum Vadd_LPF as shown in FIG. 27. To address this problem, in the ninth embodiment, the detection is performed at a time t_AD1 or t_AD2 near a central value of the sum Vadd_LPF.

As described above, in the ninth embodiment, through detecting the sum of the three-phase terminal voltages, which pulsates at the frequency corresponding to the selection frequency of each of the offset candidate voltages, at near the central value of the pulsation, there is obtained an effect that the erroneous detection of the failure in the inverter 5 is prevented.

In the first to ninth embodiments described above, it should be understood that the motor 1 is not limited to a permanent magnet synchronous motor, and another motor having three-phase windings, for example, an induction motor or a synchronous reluctance motor, may be used.

Moreover, the offset voltage Voffset described in the first to ninth embodiments is different from a common mode voltage Vn, which is superimposed to apply a two-phase modulation method or a third harmonic superimposition method to the three-phase voltage command values Vub, Vvb, and Vwb for the purpose of improving the voltage utilization rate of the inverter 5.

The reason is described below with reference to the drawings.

Figure 28A:
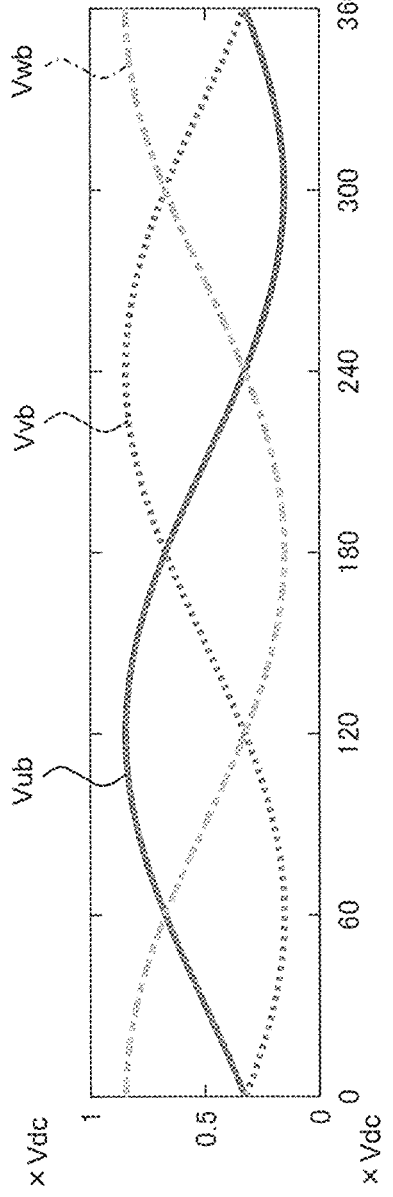
FIG. 28A to FIG. 28C are graphs for showing three-phase voltage command values, a common mode voltage, and three-phase voltage command values (modulated) for one electrical angle period of a motor obtained when a two-phase modulation method is applied to three-phase voltage command values in the eighth embodiment of FIG. 24, respectively.
Figure 28B:
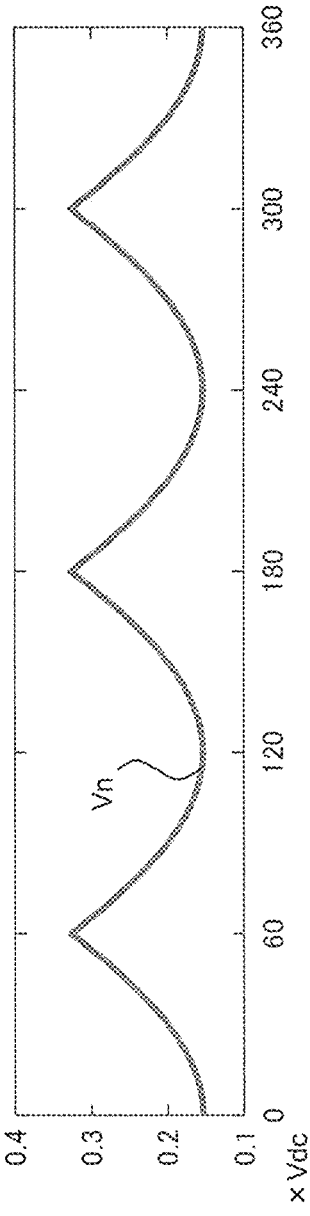
Figure 28C:
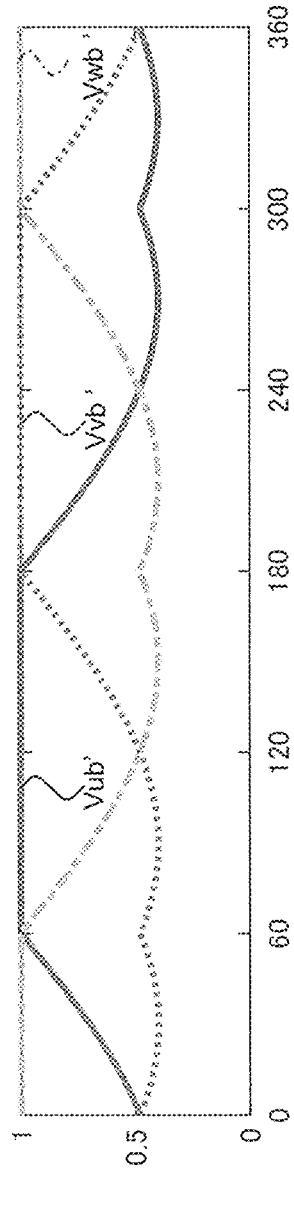

Of FIG. 28, three-phase voltage command values (Vub, Vvb, and Vwb) with respect to one electrical angle period of the motor 1 in a case where a two-phase modulation method is applied to the three-phase voltage command values Vub, Vvb, and Vwb are shown in FIG. 28A, the common mode voltage Vn is shown in FIG. 28B, and modulated three-phase voltage command values (Vub', Vvb', and Vwb') are shown in FIG. 28C. The modulated three-phase voltage command values (Vub', Vvb', and Vwb') are obtained by adding the common mode voltage Vn to the three-phase voltage command values (Vub, Vvb, and Vwb). The three-phase voltage command values (Vub', Vvb', and Vwb') in FIG. 28C have been subjected to modulation processing such that the largest voltage command value in the three-phase voltage command values matches an output upper limit value (Vdc) of the inverter 5. When attention is focused on the common mode voltage Vn in FIG. 28B, it can be seen that, while the three-phase voltage command values are varied in one electrical angle period (360°), the common mode voltage Vn is varied at a frequency that is three times the frequency of the three-phase voltage command values (in a period of 120°). Therefore, the common mode voltage Vn to be superimposed for the two-phase modulation is varied at a frequency that is three times the electrical angle frequency.

Figure 29A:
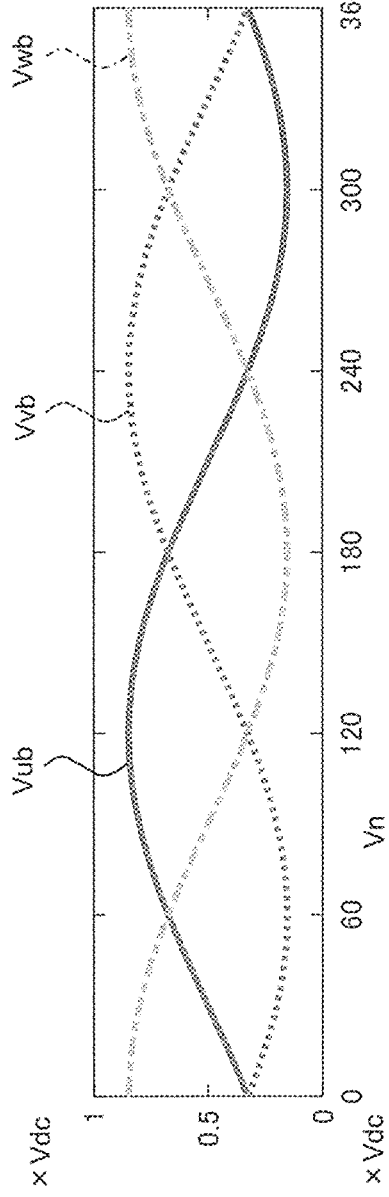
FIG. 29A to FIG. 29C are graphs for showing three-phase voltage command values, a common mode voltage, and three-phase voltage command values for one electrical angle period of the motor obtained when a two-phase modulation method is applied to the three-phase voltage command values in the eighth embodiment of FIG. 24, respectively.
Figure 29B:
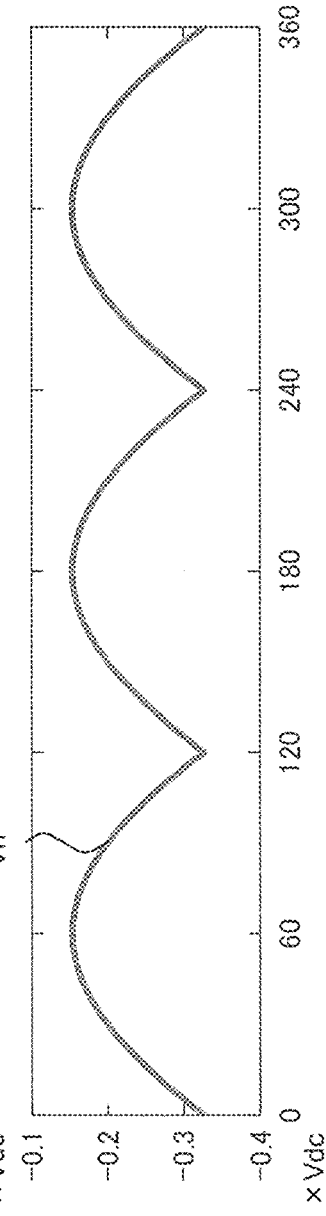
Figure 29C:
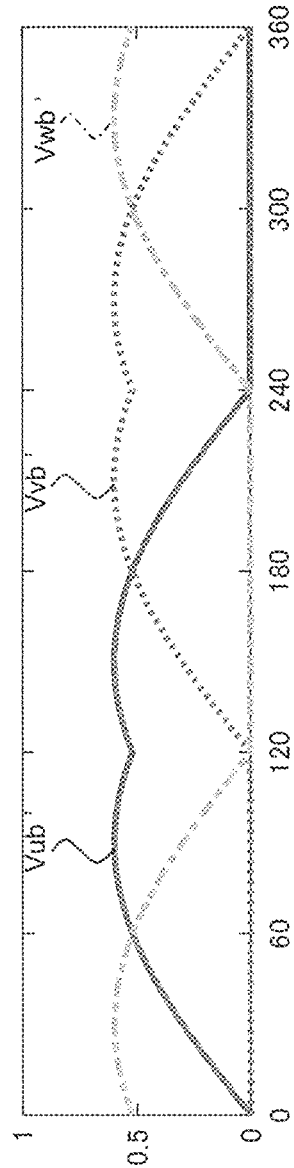

Further, of FIG. 29, three-phase voltage command values (Vub, Vvb, and Vwb) with respect to one electrical angle period of the motor 1 in a case where a two-phase modulation method is applied to the three-phase voltage command values Vub, Vvb, and Vwb are shown in FIG. 29A, the common mode voltage Vn is shown in FIG. 29B, and three-phase voltage command values (Vub', Vvb', and Vwb') are shown in FIG. 29C. The three-phase voltage command values (Vub', Vvb', and Vwb') are obtained by adding the common mode voltage Vn to the three-phase voltage command values (Vub, Vvb, and Vwb). The three-phase voltage command values in FIG. 29C (modulated) have been subjected to modulation processing such that the smallest voltage command value in the three-phase voltage command values matches an output lower limit value ("0") of the inverter 5. When attention is focused on the common mode voltage Vn in FIG. 29B, it can be seen that, while the three-phase voltage command values are varied in one electrical angle period (360°), the common mode voltage Vn is varied at a frequency that is three times the frequency of the three-phase voltage command values (in a period of 120°). Therefore, the common mode voltage Vn to be superimposed for the two-phase modulation is varied at a frequency that is three times the electrical angle frequency.

Figure 30A:
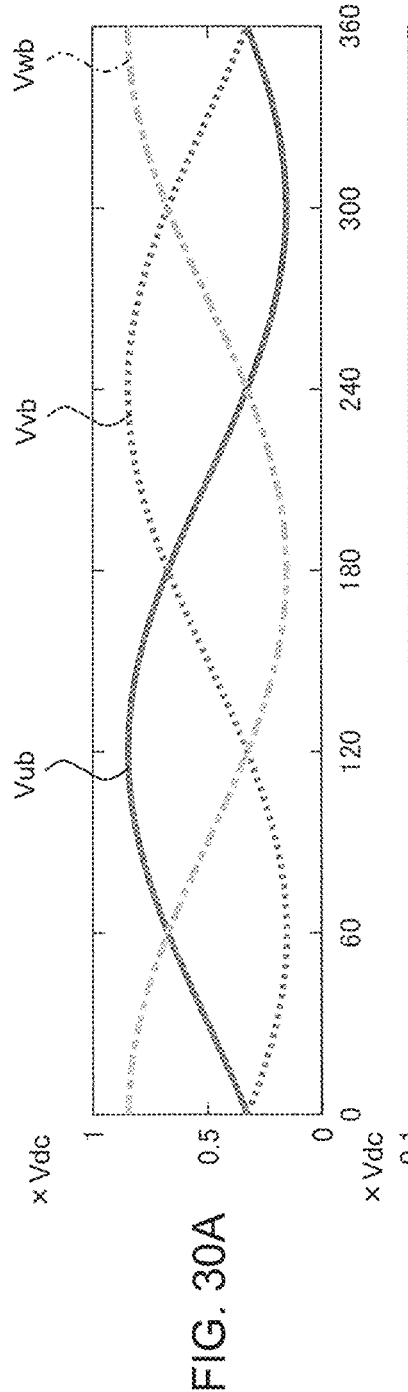
FIG. 30A to FIG. 30C are graphs for showing three-phase voltage command values (unmodulated), a common mode voltage, and three-phase voltage command values for one electrical angle period of the motor obtained when a third harmonic superimposition method is applied to the three-phase voltage command values in the eighth embodiment of FIG. 24, respectively.
Figure 30B:
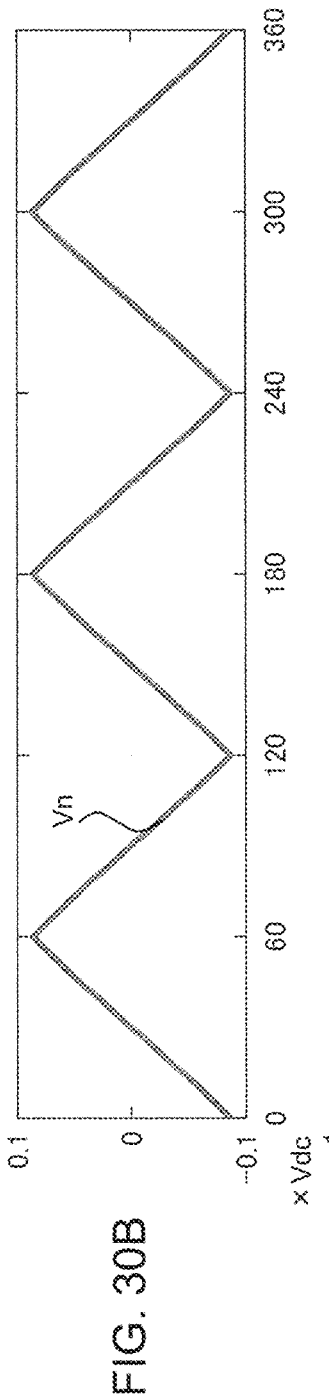
Figure 30C:
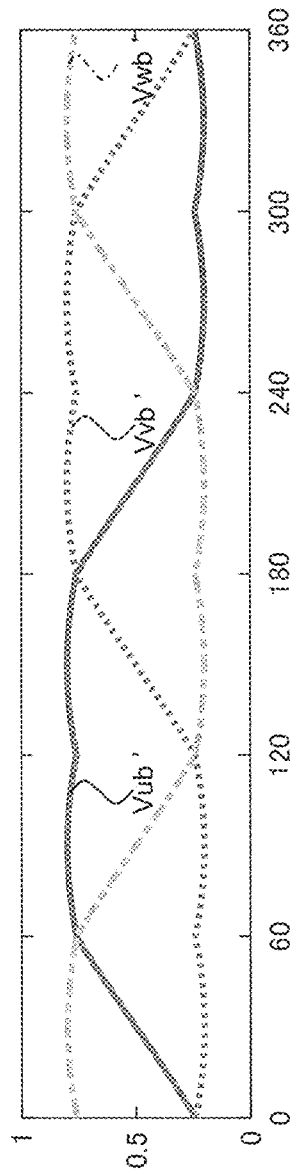

Further, of FIG. 30, three-phase voltage command values (unmodulated) with respect to one electrical angle period of the motor 1 in a case where a third harmonic superimposition method is applied to the three-phase voltage command values Vub, Vvb, and Vwb are shown in FIG. 30A, the common mode voltage Vn is shown in FIG. 30B, and three-phase voltage command values (Vub', Vvb', and Vwb') are shown in FIG. 30C. The three-phase voltage command values (Vub', Vvb', and Vwb') are obtained by adding the common mode voltage Vn to the three-phase voltage command values (Vub, Vvb, and Vwb). When attention is focused on the common mode voltage Vn in FIG. 30B, it can be seen that, while the three-phase voltage command values are varied in one electrical angle period (360°), the common mode voltage Vn is varied at a frequency that is three times the frequency of the three-phase voltage command values (in a period of 120°). Therefore, the common mode voltage Vn to be superimposed in the third harmonic superimposition method is varied at a frequency that is three times the electrical angle frequency.

As described above, as can be seen from FIG. 28 to FIG. 30, the common mode voltage Vn to be superimposed for the purpose of improving the voltage utilization rate in the two-phase modulation method, the third harmonic superimposition method, or the like, has a frequency component that is three times the frequency of the three-phase voltage command values (Vub, Vvb, and Vwb). The frequency of the three-phase voltage command values (Vub, Vvb, and Vwb) is proportional to the rotational speed of the motor 1, and hence the frequency of the common mode voltage Vn is also proportional to the rotational speed of the motor 1. Therefore, when the rotational speed of the motor 1 is zero, and the frequency of the three-phase voltage command values (Vub, Vvb, and Vwb) is also zero, the frequency of the common mode voltage Vn is zero (DC value).

However, the offset voltage Voffset described in the first to ninth embodiments is to be added to the three-phase voltage command values (Vub, Vvb, and Vwb) or the three-phase voltage command values (Vub', Vvb', and Vwb') at the frequency corresponding to the selection frequency of each of the offset candidate voltages, and even when the frequency of the three-phase voltage command values is zero (and the rotational speed of the motor 1 is zero), the offset voltage Voffset is superimposed at the frequency corresponding to the selection frequency of each of the offset candidate voltages in the same manner. Therefore, the common mode voltage Vn intended to improve the voltage utilization rate and the offset voltage Voffset described in the first to ninth embodiments have different frequencies.

It should be noted, however, that a case in which, when the frequency of the three-phase voltage command values is increased from zero, the frequency of the common mode voltage Vn matches a frequency corresponding to the selection frequency of each of the offset candidate voltages at a frequency is excluded. Moreover, in the first embodiment, it has been described that settings are made so that then offset candidate voltages are output as the offset voltage within 20 ms as the predetermined time interval.

Further, in the present invention, n is the natural number of three or more, and hence three or more offset candidate voltages are output as the offset voltage within 20 ms. Therefore, the switching period (predetermined time interval) of the offset candidate voltages as the offset voltage is 20/3=6.66 ms or less.

Therefore, as compared to the common mode voltage Vn near a zero speed of the motor 1 being substantially a direct current having a frequency close to zero, the variation frequency of the voltage value of the offset voltage Voffset superimposed from the zero speed of the motor 1 is high. Therefore, the offset voltage Voffset and the common mode voltage Vn, which is to be superimposed for the purpose of improving the voltage utilization rate, are different.

The present invention is not limited to the motor control device described above in the first to ninth embodiments, but configurations described in the first to ninth embodiments may be combined, partially modified, or partially omitted as appropriate without departing from the spirit of the present invention.

REFERENCE SIGNS LIST 1 motor, 2 rotational position detector, 3 DC power source, 4 smoothing capacitor, 5 inverter, 6a, 6b three-phase voltage command value calculation unit, 7, 7b, 7c offset voltage calculation unit, 8 modified three-phase voltage command value calculation unit, 20, 30 current detector, 801 low-pass filter, 802 voltage detector, 903 torque detector, Sup to Swp, Sun to Swn switching element

The invention claimed is:

1. A motor control device, comprising:
an inverter configured to convert a DC voltage into an AC voltage to output three-phase terminal voltages;
a motor to be driven by being applied with the three-phase terminal voltages from the inverter to generate an assist torque for assisting a driver in steering;
a three-phase voltage command value calculation unit configured to calculate three-phase voltage command values for controlling the motor to be in a set state;
an offset voltage calculation unit configured to calculate an offset voltage; and
a modified three-phase voltage command value calculation unit configured to add the offset voltage equally to each phase of the three-phase voltage command values to output modified three-phase voltage command values,
wherein the inverter is configured to output the three-phase terminal voltages based on comparison between each of the modified three-phase voltage command values and a PWM carrier wave, and
wherein the offset voltage calculation unit is configured to switch the offset voltage among n offset candidate voltages (n is a natural number of three or more) having different values at set time intervals for output to vary timings to turn on and timings to turn off the three-phase terminal voltages equally for all phases.

2. The motor control device according to claim 1, wherein the offset voltage calculation unit is configured to set, with a maximum voltage and a minimum voltage of the n offset candidate voltages being defined as an offset candidate maximum voltage and an offset candidate minimum voltage, respectively, a difference between the offset candidate maximum voltage and the offset candidate minimum voltage to be 10% or more of the DC voltage.

3. The motor control device according to claim 2, wherein the offset voltage calculation unit is configured to set, with a maximum voltage and a minimum voltage of the n offset candidate voltages being defined as an offset candidate maximum voltage and an offset candidate minimum voltage, respectively, a difference between the offset candidate maximum voltage and the offset candidate minimum voltage to be 44% or less of the DC voltage.

4. The motor control device according to claim 3, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

5. The motor control device according to claim 2, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

6. The motor control device according to claim 1, wherein the offset voltage calculation unit is configured to set, with a maximum voltage and a minimum voltage of the n offset candidate voltages being defined as an offset candidate maximum voltage and an offset candidate minimum voltage, respectively, a difference between the offset candidate maximum voltage and the offset candidate minimum voltage to be 44% or less of the DC voltage.

7. The motor control device according to claim 6, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

8. The motor control device according to claim 1,
wherein the natural number n is five or more, and
wherein the offset voltage calculation unit is configured to set the n offset candidate voltages so that, of (n−1)

voltage differences between an i-th offset candidate voltage (i: 1, 2, . . . , n) and a j-th offset candidate voltage (j: 1, 2, . . . , n, i≠j) having a voltage value that is closest to a voltage value of the i-th offset candidate voltage, at least one of the voltage differences is different from others of the voltage differences.

9. The motor control device according to claim 8, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

10. The motor control device according to claim 1, wherein the offset voltage calculation unit is configured to set the n offset candidate voltages so that, with a maximum voltage and a minimum voltage of the n offset candidate voltages being defined as an offset candidate maximum voltage and an offset candidate minimum voltage, respectively, and with an average value of the n offset candidate voltages being defined as an offset candidate average voltage, when an i-th offset candidate voltage (i: 1, 2, . . . , n) takes a value close to the offset candidate maximum voltage or the offset candidate minimum voltage, (n−1) voltage differences between the i-th offset candidate voltage and a j-th offset candidate voltage (j: 1, 2, . . . , n, i≠j) having a voltage value that is closest to a voltage value of the i-th offset candidate voltage become smaller, and when the i-th offset candidate voltage takes a value close to the offset candidate average voltage, the voltage differences become larger.

11. The motor control device according to claim 10, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

12. The motor control device according to claim 1, further comprising a current detector configured to detect motor currents, which are electric currents flowing through the motor,
wherein the PWM carrier wave is a triangle wave having a single period, and
wherein the three-phase voltage command value calculation unit is configured to calculate the three-phase voltage command values based on the motor currents detected at a time point close to a maximum value or a minimum value of the PWM carrier wave.

13. The motor control device according to claim 12,
wherein the current detector is current detecting resistance elements arranged in series with lower-arm switching elements of the inverter, and
wherein the three-phase voltage command value calculation unit is configured to calculate the three-phase voltage command values so as to secure a conduction period of the lower-arm switching elements, during which the motor currents are detectable by the current detecting resistance elements.

14. The motor control device according to claim 12,
wherein the current detector is current detecting resistance elements arranged in series with lower-arm switching elements of the inverter, and
wherein the offset voltage calculation unit is configured to calculate the offset voltage so as to secure a conduction period of the lower-arm switching elements, during which the motor currents are detectable by the current detecting resistance elements.

15. The motor control device according to claim 1, wherein the offset voltage calculation unit is configured to set the offset voltage to zero when a modulation ratio of the three-phase voltage command values exceeds a modulation ratio threshold value.

16. The motor control device according to claim 1, wherein the offset voltage calculation unit is configured to set the offset voltage to zero when an rpm of the motor exceeds an rpm threshold value.

17. The motor control device according to claim 1, further comprising:
a low-pass filter provided at an output terminal of the inverter to output the three-phase terminal voltages having a frequency component of the PWM carrier wave contained in the three-phase terminal voltages removed; and
a voltage detector configured to detect a sum of the three-phase terminal voltages output by the low-pass filter,
wherein the offset voltage calculation unit is configured to set a frequency corresponding to a selection frequency of each of the n offset candidate voltages as the offset voltage to be higher than a cutoff frequency of the low-pass filter.

18. The motor control device according to claim 1, further comprising:
a low-pass filter provided at an output terminal of the inverter to output the three-phase terminal voltages having a frequency component of the PWM carrier wave contained in the three-phase terminal voltages removed; and
a voltage detector configured to detect the three-phase terminal voltages output by the low-pass filter,
wherein the voltage detector is configured to perform voltage detection near a central value of the three-phase terminal voltages output from the low-pass filter, which pulsate at a frequency corresponding to a selection frequency of each of the n offset candidate voltages as the offset voltage in the offset voltage calculation unit.

* * * * *